(12) United States Patent
Chung

(10) Patent No.: US 11,178,443 B1
(45) Date of Patent: *Nov. 16, 2021

(54) SYSTEMS AND METHODS FOR PERSONALIZED FEATURE SETUP AND PARENTAL GUIDANCE SENSING

(71) Applicant: DIRECTV, LLC, El Segundo, CA (US)

(72) Inventor: John I. Chung, Encino, CA (US)

(73) Assignee: DIRECTV, LLC, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/294,072

(22) Filed: Mar. 6, 2019

Related U.S. Application Data

(63) Continuation of application No. 14/587,496, filed on Dec. 31, 2014, now Pat. No. 10,334,303.

(51) Int. Cl.
| | |
|---|---|
| *H04N 21/436* | (2011.01) |
| *H04N 21/45* | (2011.01) |
| *H04N 21/41* | (2011.01) |
| *H04N 21/442* | (2011.01) |
| *H04N 21/61* | (2011.01) |
| *H04N 7/20* | (2006.01) |
| *H04N 21/4363* | (2011.01) |

(52) U.S. Cl.
CPC ........... *H04N 21/4126* (2013.01); *H04N 7/20* (2013.01); *H04N 21/43615* (2013.01); *H04N 21/43637* (2013.01); *H04N 21/44231* (2013.01); *H04N 21/4516* (2013.01); *H04N 21/4532* (2013.01); *H04N 21/6143* (2013.01); *H04N 21/6193* (2013.01)

(58) Field of Classification Search
CPC ................ H04N 21/4126; H04N 7/20; H04N 21/43615; H04N 21/43637; H04N 21/44231; H04N 21/4516; H04N 21/4532; H04N 21/6143; H04N 21/6193; G06F 1/1626; H04W 8/18
USPC ........................................................ 725/133
See application file for complete search history.

(56) References Cited

U.S. PATENT DOCUMENTS

| | | |
|---|---|---|
| 7,236,742 B2 | 6/2007 | Hall et al. |
| 8,924,999 B1 | 12/2014 | Santangelo et al. |
| 2006/0205410 A1 | 9/2006 | Black |
| 2007/0083906 A1 | 4/2007 | Welingkar |
| 2007/0162502 A1 | 7/2007 | Thomas et al. |
| 2007/0276925 A1 | 11/2007 | La Joie et al. |
| 2008/0141293 A1 | 6/2008 | Blanchard et al. |
| 2009/0303097 A1 | 12/2009 | Reams et al. |

(Continued)

*Primary Examiner* — Alfonso Castro
(74) *Attorney, Agent, or Firm* — Hanley, Flight & Zimmerman, LLC

(57) ABSTRACT

A user receiving device includes a proximity circuit configured to repeatedly detect a proximity of a first mobile device relative to the user receiving device. An interruption circuit is configured to, based on the detection of a first mobile device, generate an interrupt signal to interrupt a program or a video being played out on a display when the proximity is less than a predetermined range and ceasing to generate the interrupt signal when the proximity is greater than the predetermined range. A control circuit is configured to, when the interrupt signal is no longer generated, resume playing the program or video on the display.

20 Claims, 12 Drawing Sheets

(56) References Cited

U.S. PATENT DOCUMENTS

| | | | |
|---|---|---|---|
| 2011/0016492 A1* | 1/2011 | Morita | H04N 21/4622 |
| | | | 725/58 |
| 2011/0072452 A1* | 3/2011 | Shimy | H04N 7/163 |
| | | | 725/25 |
| 2011/0271301 A1* | 11/2011 | Kennedy | H04N 7/16 |
| | | | 725/38 |
| 2011/0273625 A1 | 11/2011 | McMahon et al. | |
| 2012/0084662 A1 | 4/2012 | Navarro et al. | |
| 2012/0112877 A1 | 5/2012 | Gravino et al. | |
| 2013/0219072 A1 | 8/2013 | Han et al. | |
| 2013/0312018 A1 | 11/2013 | Elliott et al. | |
| 2014/0120832 A1 | 5/2014 | Confer et al. | |
| 2014/0250447 A1* | 9/2014 | Schink | H04N 21/478 |
| | | | 725/10 |
| 2015/0070516 A1 | 3/2015 | Shoemake et al. | |
| 2015/0245095 A1* | 8/2015 | Gonzalez | H04N 21/4756 |
| | | | 725/28 |
| 2016/0080510 A1 | 3/2016 | Dawoud Shenouda Dawoud et al. | |

\* cited by examiner

SYSTEMS AND METHODS FOR PERSONALIZED FEATURE SETUP AND PARENTAL GUIDANCE SENSING

CROSS-REFERENCE TO RELATED APPLICATIONS

This application is a continuation of U.S. patent application Ser. No. 14/587,496 filed on Dec. 31, 2014. The entire disclosures the above application is incorporated herein by reference.

TECHNICAL FIELD

The present disclosure relates generally to television systems and, more specifically, to systems and methods for controlling a display of a user receiving device in the presence of one or more mobile devices.

BACKGROUND

The statements in this section merely provide background information related to the present disclosure and may not constitute prior art.

Satellite television has become increasingly popular due to a wide variety of content and the quality of content available. A satellite television system typically includes a set top box that is used to receive satellite signals and decode the satellite signals for use on a television. The set top box typically has a memory associated therewith. The memory may include a digital video recorder or the like as well as storage for an operating code of the set top box.

Content providers provide a variety of content to consumers. Available content is typically received at a set top box (or user receiving device) and displayed to the user using a guide. The guide typically includes channels and timeslots as well as programming information for each information timeslot. The programming information may include the content title and other identifiers such as actor information and the like. The user selects a channel via the guide and the set top box (STB) then displays the channel on a display (e.g., a television).

The content available to a user device is broad. Some content may not be suitable for all users. A set top box may be used in a family setting that has users with a variety of ages. Some content may not be suitable for all ages.

The STB may have parental control software that is used to prevent children from watching certain content by blocking access to, for example, certain channels, programs, and/or videos. Parental controls are provided that enable a parent to prevent the display of certain types of content. The parental control software can require a passcode for access to the blocked content. Children attempting to access the blocked content may encounter, for example, a passcode screen requiring entry of a passcode in order to access the blocked content. Parents may enter the passcode to watch the blocked content.

SUMMARY

The present disclosure provides systems and methods for controlling access to content based on one or more mobile devices being in proximity of a user receiving device.

In one aspect of the disclosure, a user receiving device is provided and includes a proximity module, a mode module, a profile module and an output module. The proximity module is configured to detect a first mobile device in a proximity of the user receiving device. The mode module is configured to transition the user receiving device to an active mode based on the detection of the first mobile device. The profile module is configured to, subsequent to transitioning to the active mode and based on an identifier of the first mobile device, access a first profile allocated to the first mobile device or a user of the first mobile device. The output module, based on the first profile, is configured to display on a display a guide or content.

In another aspect of the disclosure, a user receiving device is provided and includes a proximity module, an interruption module, and a control module. The proximity module is configured to detect a first mobile device in a proximity of the user receiving device. The interruption module is configured to, based on the detection of the first mobile device, generate an interrupt signal to interrupt a program or video being played out on a display and generate a resume message to resume playing of the program or video. The control module is configured to receive an input signal from a remote control device or a second mobile device. The interrupt module is configured to, based on the input signal, no longer generate the interrupt signal or generate a resume signal. The control module is configured to, if the interrupt signal is no longer generated or based on the resume signal, resume playing the program or video on the display.

In another aspect of the disclosure, a mobile device is provided and includes a proximity module, a mode module, a profile module and a control module. The proximity module configured to detect a user receiving device. The mode module is configured to transition the mobile device to an active mode based on the detection of the user receiving device. The profile module is configured to transmit a profile to the user receiving device subsequent to transition to the active mode. The control module is configured to select a program, transmit a selection signal to the user receiving device indicating the selected program, and based on the selected program, receive an interaction option signal from the user receiving device. The interaction option signal indicates that the mobile device may interact with the selected program via the mobile device.

A first mobile device is provided and includes a proximity module, a mode module, a control module and an interruption module. The proximity module is configured to detect a user receiving device. The mode module is configured to transition the first mobile device to an active mode based on the detection of the user receiving device. The control module is configured to, subsequent to transitioning to the active mode, transmit a profile to the user receiving device, adjust a setting of the user receiving device, or select a program or video. The interruption module is configured to receive an interrupt signal from the user receiving device as a result of a second mobile device being in a proximity of the user receiving device. A program or video being played out on a display connected to the user receiving device is interrupted by the user receiving device due to the proximity of the second mobile device to the user receiving device. The control module is configured to, based on a profile of the second mobile device or an input received from a user of the first mobile device, transmit a resume signal to the user receiving device to resume play out of the program or video.

In another aspect of the disclosure, a method is provided and includes: detecting a first mobile device in a proximity of a user receiving device; transitioning the user receiving device to an active mode based on the detection of the first mobile device; subsequent to transitioning to the active mode and based on an identifier of the first mobile device, accessing a first profile allocated to the first mobile device or a user of the first mobile device; and based on the first profile, displaying on a display a guide or content.

In another aspect of the disclosure, a method is provided and includes: detecting a first mobile device in a proximity of a user receiving device; based on the detection of the first mobile device, generating an interrupt signal to interrupt a program or video being played out on a display and generating a resume message to resume playing of the program or video; receiving an input signal from a remote control device or a second mobile device; based on the input signal, ceasing to generate the interrupt signal or generating a resume signal; and if the interrupt signal is no longer generated or based on the resume signal, resuming playing of the program or video on the display.

In another aspect of the disclosure, a method is provided and includes: detecting a user receiving device in proximity to a mobile device; transitioning the mobile device to an active mode based on the detection of the user receiving device; transmitting a profile to the user receiving device subsequent to transitioning to the active mode; selecting a program; transmitting a selection signal to the user receiving device indicating the selected program; based on the selected program, receiving an interaction option signal from the user receiving device, wherein the interaction option signal indicates that the mobile device may interact with the selected program via the mobile device.

In another aspect of the disclosure, a method is provided and includes: detecting a user receiving device in proximity to a first mobile device; transitioning the first mobile receiving device to an active mode based on the detection of the user receiving device; subsequent to transitioning to the active mode, transmitting a profile to the user receiving device, adjusting a setting of the user receiving device, or selecting a program or video; receiving an interrupt signal from the user receiving device as a result of a second mobile device being in a proximity of the user receiving device, wherein a program or video being played out on a display connected to the user receiving device is interrupted by the user receiving device due to the proximity of the second mobile device to the user receiving device; and based on a profile of the second mobile device or an input received from a user of the first mobile device, transmitting a resume signal to the user receiving device to resume play out of the program or video.

In another aspect of the disclosure, a user receiving device includes a proximity circuit configured to repeatedly detect a proximity of a first mobile device relative to the user receiving device. An interruption circuit is configured to, based on the detection of a first mobile device, generate an interrupt signal to interrupt a program or a video being played out on a display when the proximity is less than a predetermined range and ceasing to generate the interrupt signal when the proximity is greater than the predetermined range. A control circuit is configured to, when the interrupt signal is no longer generated, resume playing the program or video on the display.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Traditionally, parents can prevent children from watching certain channels by adjusting parental guide settings to block certain channels, such as channels that display adult content. A child attempting to access a parentally blocked channel, via a set top box, encounters a window (or screen) on a television requesting a passcode. Unless the proper passcode is entered, the channel is not displayed and the child is blocked from watching the channel.

Certain instances can arise when parents are watching parentally blocked channels, channels displaying adult content, and/or channels displaying content that the parents would prefer not be seen by a child. For example, a parent (or adult) may be watching a selected channel in a room of a house and a child may unexpectedly walk into the room and see what is being displayed on the television. Systems and methods are disclosed below to prevent this unexpected and/or accidental exposure of content to a child and/or person not otherwise having access to the content.

Figure 1:
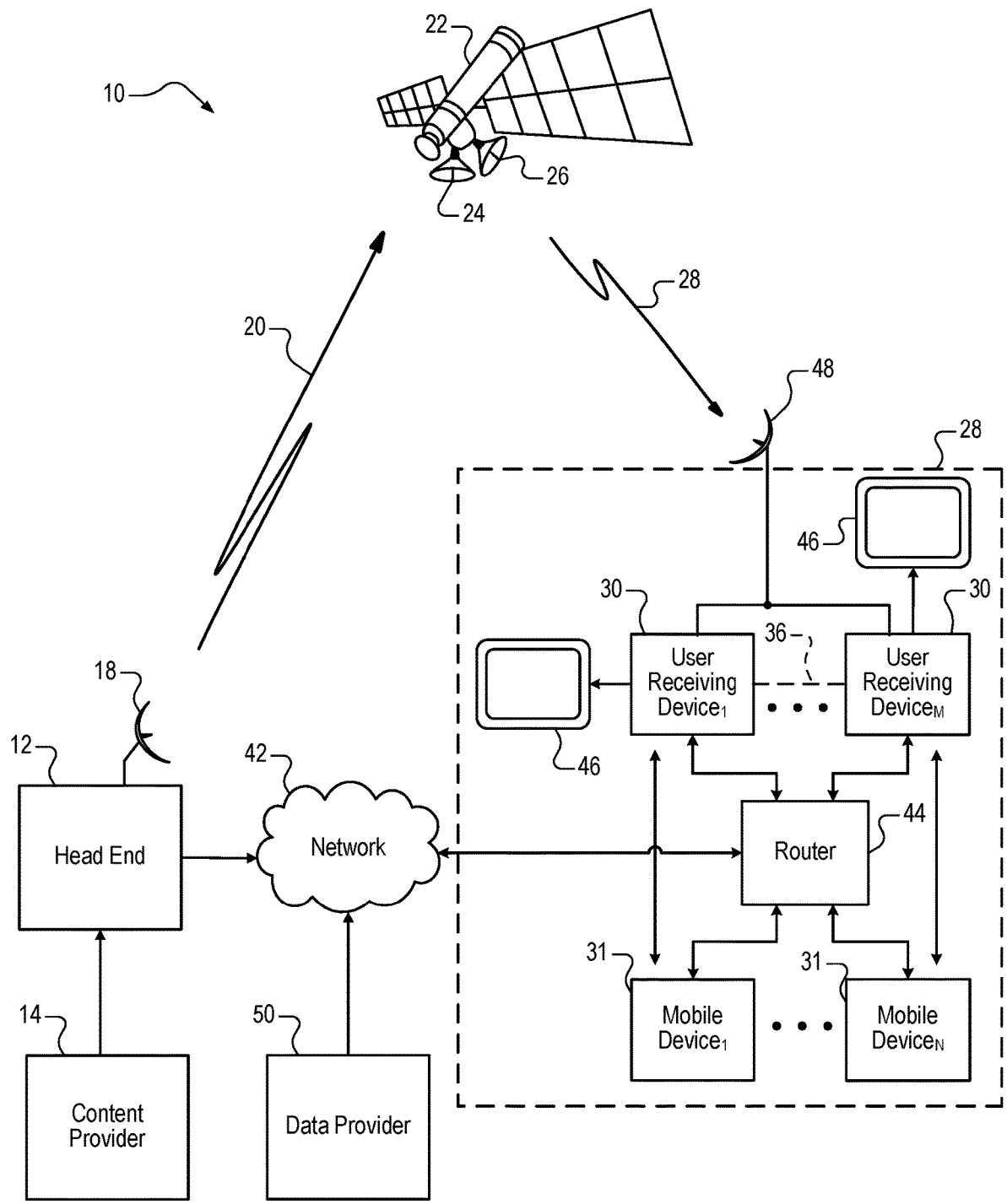
FIG. 1 is a functional block diagram of a communication system in accordance with the present disclosure.

FIG. 1 shows a communication system 10 that includes a head end 12. The head end 12 operates as a content processing system and a transmission source. The head end 12 may also be used for distributing content and providing billing data. The details of the head end 12 will be further described below with respect to FIG. 2.

One or more content providers 14, only one of which is illustrated, may provide content and data related to the content such as metadata to the head end 12. The content providers 14 may individually and/or collectively be referred to as a service provider. The content may include channels, programs, videos and/or other content. The metadata may include ratings data. Ratings data may include Motion Picture Association ratings such as G, PG, PG-13, R, NC-17 and X. Ratings data may also include television ratings such as TV-Y, TV-Y7, TV-G, TV-PG, TV-14, and TV-MA. Of course, different countries may have different rating systems. The head end 12 receives various types of content and data from the content provider 14 and communicates the content to various user devices associated with the system.

The head end 12 may communicate content to users in various manners including a satellite system and through terrestrial networks. Carrying through with the satellite example, the head end 12 includes an antenna 18 for communicating process content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlink signals 28 and communicates the downlink signals 28 to various user receiving devices 30 and/or mobile devices 31. The user receiving devices may be implemented as and/or include set top boxes.

The head end 12 may be connected to the user receiving devices 30 via a network 42 and/or a router 44. The network 42 may be a single network or a combination of different types of networks. For example, the network 42 may be a broadband wired network and/or wireless network. The network 42 may be a one-way network such that data may be communicated from the user receiving devices 30 to the head end 12. The network 42 may also be a two-way network that delivers content from the head end 12 in response to selection signals communicated from the user receiving devices 30. The network 42 may be in communication with the local area network 36. The network 42 may include an Internet.

The user receiving devices 30 may include and/or be connected to displays 46 (e.g., televisions), as shown. The displays 46 may display both video signals and output audio signals. The user receiving devices 30 may be referred to as fixed (or non-mobile) user devices because the user receiving devices are intended to be used from a fixed position on the surface of the earth. The user receiving devices 30 may include circuitry to tune, decode and store content therein. Details of the user receiving devices 30 are further described below.

The user receiving devices 30 may be in communication with each other through a network 36 such as a local area network. Content may be stored in one or more of the user receiving devices 30 and/or in a memory separate from the user receiving devices 30 and accessed by the user receiving devices 30. The content may be shared by and/or transmitted between the user receiving devices 30. The user receiving devices 30 may be located in respective rooms of a building (an example of which is designated 28), such as a home, multi-unit dwelling or business. The content may be delivered to two or more of the user receiving devices 30 during a same period of time in a multi-room viewing function. The user receiving devices 30 may be associated with one or more accounts.

The user receiving devices 30 are in communication with an antenna 48. The antenna 48 receives the downlink signals 28. Thus, the user receiving devices 30 may be referred to as satellite television receiving devices. However, the system has applicability in non-satellite applications, such as in wired or wireless terrestrial systems. The user receiving devices 30 may be included in and/or implemented as televisions, set top boxes, and/or set back boxes and thus may be referred to as fixed (or non-mobile devices). The user receiving devices 30 may be referred to as televisions, set top boxes, and/or set back boxes. The user receiving devices 30 may be interconnected.

The user receiving devices 30 may be connected to the router 44 and/or may be in communication with the network 42 and the mobile devices 31. The mobile devices 31 may be cellular phones, tablets, laptops, wearable devices, remote control devices, etc. A wearable device may be one of a number of types of devices that are worn by a user. A wearable device may be fixed wearable by a user meaning the wearable device is meant to be fixed to the user. Examples of wearable devices include a computerized watch such as a Samsung® or Apple® watch. The watch devices are fixed to an arm of the user. Another example of a wearable device is GOOGLE GLASS®, which is fixed to a head of a user. Of course, other types of wearable devices affixed to other parts of the body may be used. A wearable device may be in direct communication with the user receiving devices 30 through Bluetooth® connections. As described below, the user receiving devices 30 and the mobile devices 31 may include Bluetooth® transceivers (referred to as radios). The mobile devices 31 may also be in communication with the user receiving devices 30 via Internet protocol (IP) connections and/or the router 44. The mobile devices 31 may also be in communication with devices (e.g., the head end 12) outside the local area network via the router 44 and/or the network 42.

The router 44 may be a wireless router or a wired router or a combination of the two. For example, the user receiving devices 30 may be wired to the router 44 and wirelessly coupled to the mobile devices 31. The router 44 may communicate IP signals to the user receiving devices 30. The IP signals may be used for controlling various functions of the user receiving devices 30. IP signals may also originate from the user receiving devices 30 and be transmitted to the mobile device 31.

Figure 5:
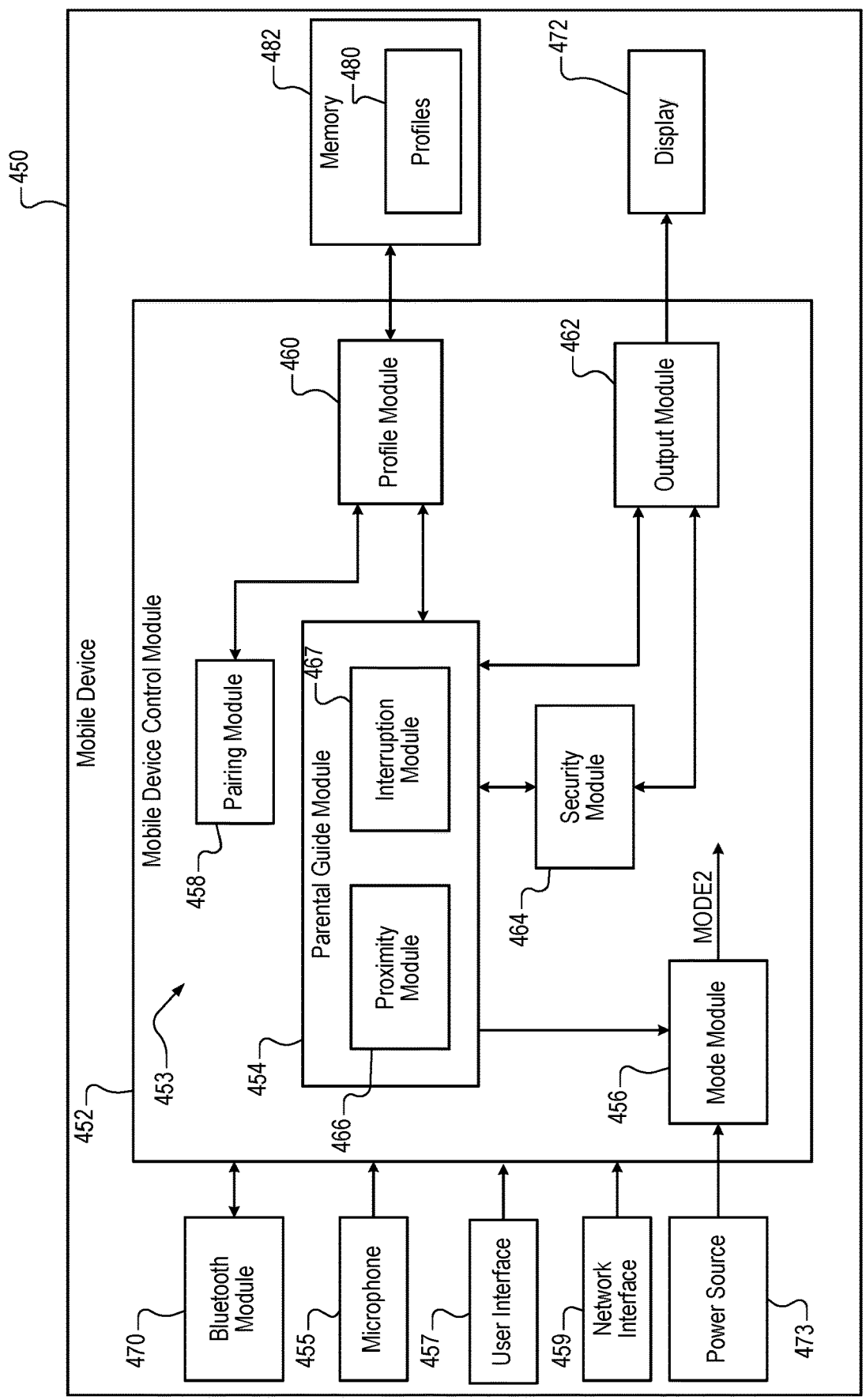
FIG. 5 is a functional block diagram of a mobile device in accordance with the present disclosure.

The mobile devices 31 may also have displays, an example of which is shown in FIG. 5. The displays of the mobile devices 31 may also display video and output audio signals. The displays may be touch screens that act as user interfaces. Other types of user interfaces on the mobile devices 31 may include buttons and switches.

The network 42 may, for example, be a public switched telephone network, the Internet, a mobile telephone network or other type of network. The network 42 may be in direct wireless communication with the mobile device 31 via a cellular system and/or may be in indirect communication with the mobile devices 31 via the router 44 and/or the user receiving devices 30.

The content provider 14 provides content to the head end 12. Although only one content provider 14 is illustrated, more than one content provider may be incorporated in the system 10. The head end 12 distributes the content through the satellite 22 and/or the network 42 to the user receiving devices 30 and/or the mobile device 31.

A data provider 50 may also provide data to the head end 12. The data provider 50 may provide various types of data such as schedule data or metadata that is provided within the program guide system. The metadata may include various descriptions, actor, director, star ratings, titles, user ratings, television or motion picture parental guidance ratings, descriptions, related descriptions and various other types of data. The data provider 50 may provide the data directly to the head end and may also provide data to various devices such as the mobile device 31 and the user receiving device 30 through the network 42. This may be performed in a direct manner through the network 42.

Figure 2:
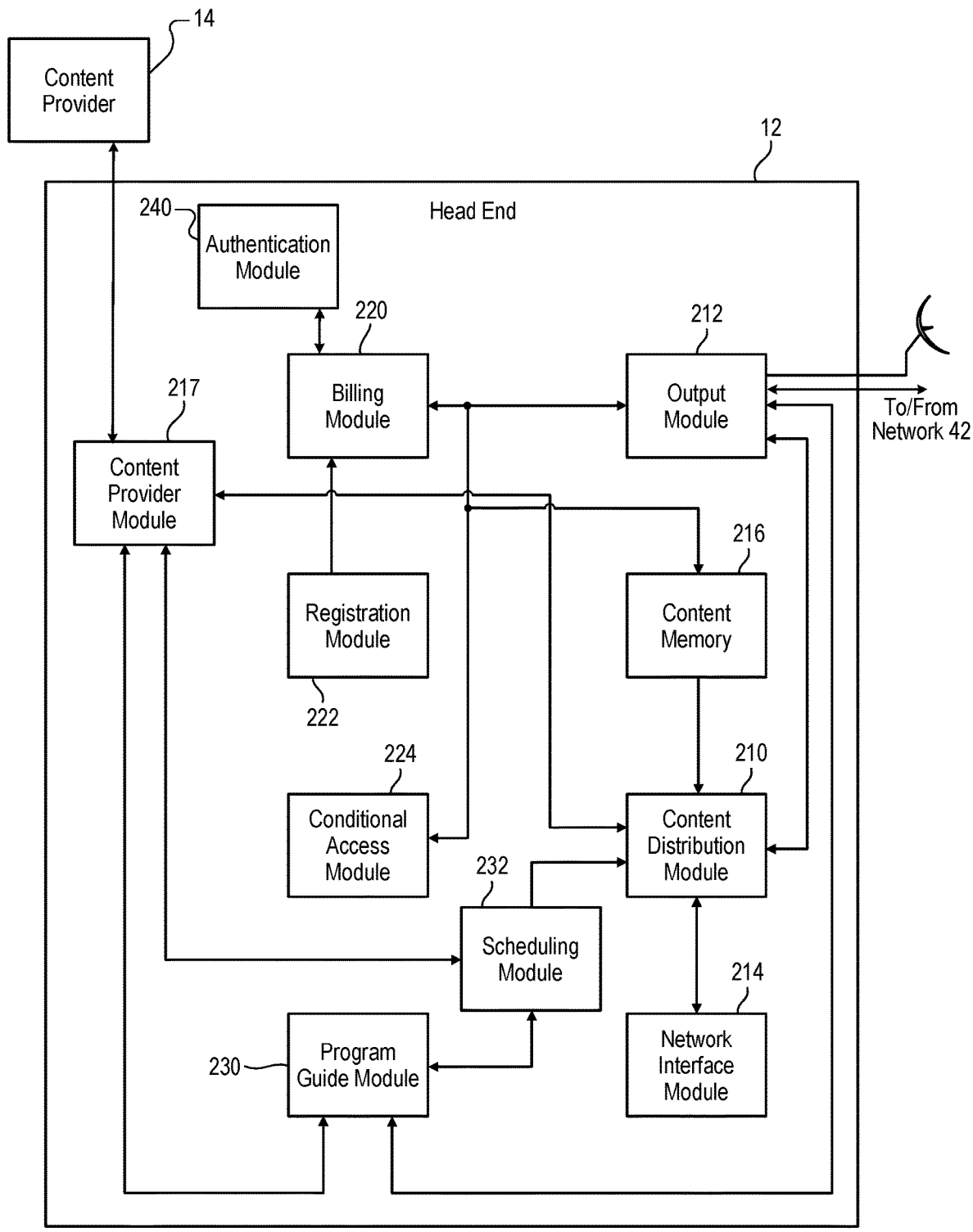
FIG. 2 is a functional block diagram of a head end in accordance with the present disclosure.

FIG. 2 shows the head end 12. It should be noted that the head end 12 is illustrated as a single device or facility, but may refer to multiple devices and/or facilities. That is, each of the individual components illustrated within the head end 12 may be physically located in various locations. The head end 12, one or more of the modules of the head end 12, and/or the memory of the head end 12 may be included in the content provider 14.

The head end 12 may include a content distribution module 210 that is used for distributing content through different means. The head end 12 may be in communication with an output module 212 for uplinking content to a satellite through the uplink antenna 18 as illustrated in FIG. 1 and/or transmitting signals to and/or receiving signals from the network 42. The output module may include and/or be implemented as an interface and/or a transceiver. The content distribution module 210 may thus format the signal in an appropriate format for uplinking through the output module 212. The output module 212 may uplink various content through the satellite to the user receiving devices 30 and/or the mobile devices 31 (collectively referred to as receiving devices) of FIG. 1. The content distribution module 210 may also transcode the content in formats suitable for use by the receiving devices.

The output module 212 may also communicate conditional access data to the receiving devices for accessing the content. The conditional access data may be communicated in a conditional access packet that includes data for tuning the receiving devices to receive the data. The conditional access data may be received directly or indirectly from a conditional access module 224. The conditional access module 224 may provide conditional access signals to a billing module 220 to allow a particular user access to content. The conditional access module 224 may generate a conditional access packet (CAP) together with data from the billing module 220 for uplinking through the output module 212. If the content is satellite content, access data such as, but not limited to, the particular transponder, channel and time at which the content is broadcasted may be provided in the CAP. If the content is to be provided over an Internet or other broadband-type network, an IP address of the content may be provided. The CAP may also include encryption/decryption information for the receiving devices to receive the content and decode the content.

The content distribution module 210 may also be in communication with a network interface module 214. The network interface module 214 may be in communication with the network 42 (shown in FIG. 1) for communicating content therethrough. The network interface module 214 (or the content distribution module 210) may format the content signals into internet protocol signals for distribution through the network 42.

The content distribution module 210 may also be in communication with content memory 216. The content memory 216 may be referred to as a content repository. The content memory 216 may receive content from a content providing module 217 for distribution through the satellite system or the network 42. The content providing module 217 may receive content from the content provider 14. The content memory 216 may save on-demand or pay-per-view content therein.

The content providing module 217 may also provide live television content for distribution through the content distribution module 210. The content distribution module 210 may thus communicate live content through the output module 212 or through the network interface module 214 to the appropriate networks.

The content providing module 217 processes received content for communication through the satellite 22 or network 42. The content providing module 217 may communicate live content as well as recorded content. The content memory 216 may store On-Demand or Pay-Per-View content for distribution at various times. The Pay-Per-View content may be broadcasted in a linear fashion (at a predetermined time according to a predetermined schedule). Linear content may be presently broadcasted and may also be scheduled to be broadcasted in the future. The content memory 216 may also store On-Demand content therein. On-Demand content is content that is broadcasted at the request of a user receiving device and may occur at any time (not on a predetermined schedule). On-Demand content is referred to as non-linear content.

A billing module 220 may also be incorporated into the head end 12. The billing module 220 may be used for associating one or more receiving devices with a user account. For example, different types of receiving devices such as mobile devices and one or more fixed set top boxes may be associated with a user account. By associating the receiving devices with a user account, content may be shared or accessed by each of the receiving devices associated with the account.

A registration module 222 may be used to associate each of the receiving devices with a user account at the billing module 220. The registration module 222 may be an automated system through which the user calls or accesses remotely by computer for associating the receiving devices with the account. The registration module 222 may also be partially human activated in which a customer service representative enters data for multiple receiving devices and associates the receiving devices with an account.

A program guide module 230 may also be included within the head end 12. The program guide module 230 receives metadata and other data from the content providing module 217. The program guide module 230 is ultimately used to communicate content and metadata to the output module 212. The program guide module may thus contain data related to the ratings of the particular content to be broadcasted and controlled by the content distribution module 210.

The program guide module 230 communicates program guide data to the user receiving devices 30 illustrated in FIG. 1. The program guide module 230 may create various objects with various types of data. The program guide module 230 may, for example, include schedule data, various types of descriptions for the content and content identifier that uniquely identifies each content item. The program guide module 230, in a typical system, communicates up to two weeks of advanced guide data for linear content to the user receiving devices. The guide data includes tuning data such as time of broadcast data, end time data, channel data, and transponder data name a few. Guide data may also include content available on-demand and pay-per-view content.

A scheduling module 232 may be in communication with the program guide module 230 and the content distribution module 210 to arrange the content to be distributed as well as provide program guide data for the content to be distributed. The scheduling module 232 may also be in communication with the content providing module 217 for obtaining a schedule for live channel broadcast.

An authentication module 240 may be used to authenticate various user receiving devices and mobile devices that communicate with the head end 12. The authentication module 240 may be in communication with a billing module 220. The billing module 220 may provide data for subscriptions and various authorizations suitable for the user receiving devices and the mobile devices. The authentication module 240 ultimately permits the user receiving devices and mobile devices to communicate with the head end 12. Authentication may be performed by providing a user identifier, a password, a user device identifier or combinations thereof. Channels and/or programs may be provided to the user receiving devices and/or mobile devices based on passcodes, as further described below.

Figure 3:
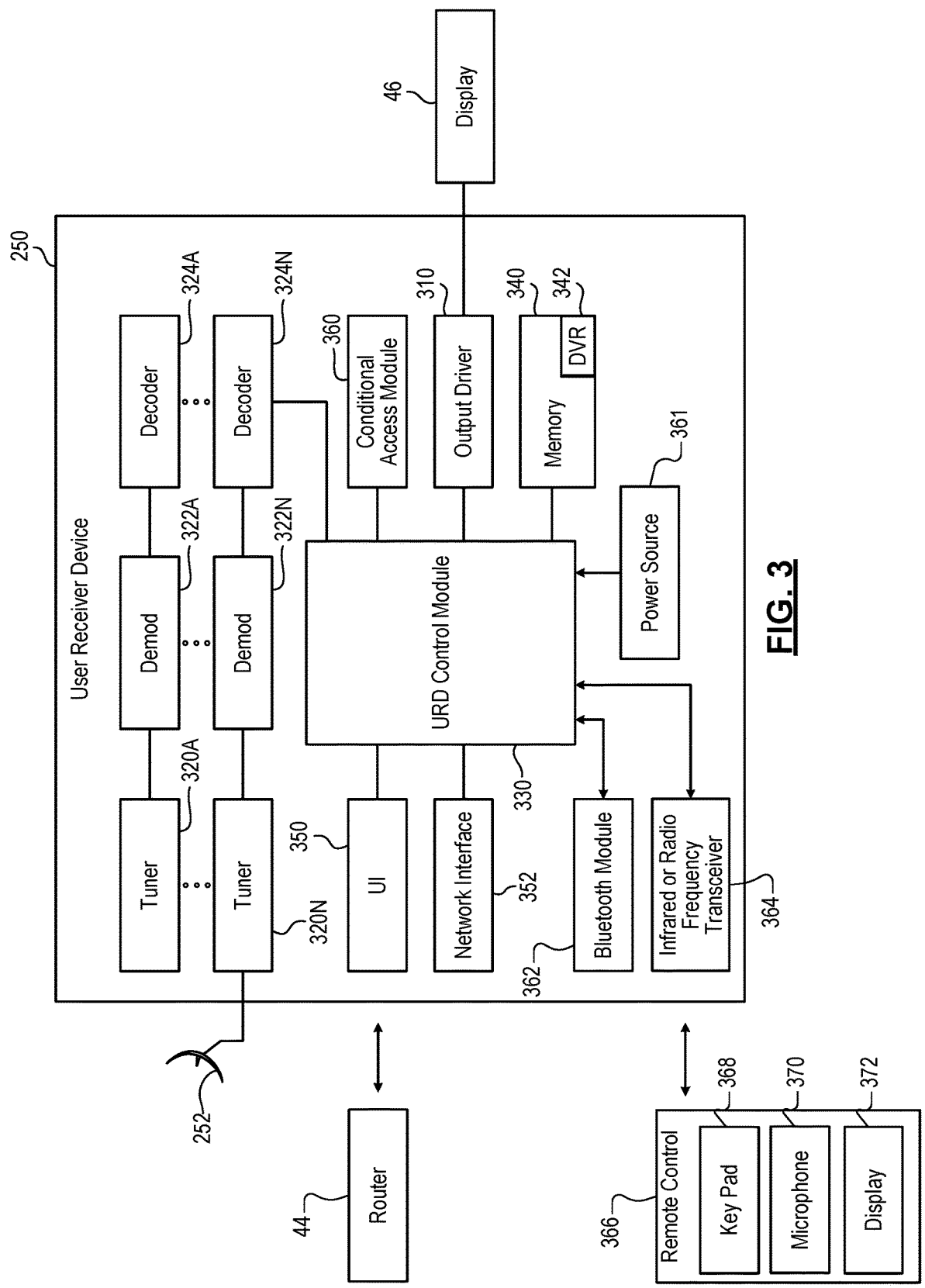
FIG. 3 is a functional block diagram of a user receiving device in accordance with the present disclosure.

FIG. 3 shows a user receiving device 250 that may replace any of the user receiving devices 30 of FIG. 1. Although, a particular example using the user receiving device 250 as a satellite set top box is illustrated, it is merely representative of various electronic devices with an internal control module (or controller) used as a content receiving device. An antenna 252 may be one of a number of different types of antennas used for receiving satellite signals that may include one or more low noise blocks associated therewith. The antenna 252 may be a single antenna used for satellite television reception. Of course, multiple antennas for receiving signals from satellites in different orbital slots may be used. In a terrestrial system such as a cable television system, no antenna may be used. Rather, a connector to a fiber optic or coaxial cable may be used. Terrestrial systems may have an antenna suitable for receiving terrestrial wireless signals. The user receiving device 250 is connected to a display (e.g., one of the displays 46). The user receiving device 250 may have an output driver 310 for formatting video and audio signals for output to the display 46.

A user receiving device control module 330 may be used to coordinate and control the various functions of the user receiving device 250. The user receiving device control module 330 may include and/or be implemented as a controller. These functions may include functions of: tuners 320A-320N (collectively 320); demodulators 322A-322N (collectively 322); decoders 324A-324N (collectively 324) such as forward error correction decoders; and any corresponding buffers and/or other related functions.

The tuners 320 receive respective signals or data from corresponding individual channels. The tuners 320 may receive data from a satellite or a source such as cable or over-the-air TV broadcasts. The tuners 320 may receive television programming content, program guide data or other types of data. The demodulators 322 demodulate the signals or data to form a demodulated signal or data. The decoders 324 decode the demodulated signals to form decoded data or decoded signals. By providing a number of tuners, demodulators and decoders, a number of different content programs may be used by the user receiving device 250. For example, live viewing and recording may be performed simultaneously. A number of recordings may be made simultaneously depending on the number of tuners available.

The user receiving device control module 330 is in communication with a memory 340. The memory 340 is illustrated as a single box. The memory 340 may be implemented as multiple different types of memories including a hard drive, a flash drive and various other types of memory devices. The memory 340 may be other types of memory or sections of different types of memory. The memory 340 may be non-volatile memory or volatile memory. The memory 340 may include a DVR 342. The DVR 342 may include recorded content stored for later playback.

The memory 340 may include storage for various operational data collected during operation of the user receiving device 250. For example, the memory 340 may store user configuration data for each user associated with a device or system. The user configuration data may include rating limits set by a user of the user receiving device 250. A default user configuration may also be established in case visual recognition is not achieved. This will be described in detail below. Other types of data in the memory 340 may include the channel subscription data, the blocked channels, adult channels, current set top box language, TV resolution data, to do list data, the conditional access module identifier, time zone data, time of day daylight savings, status data, aspect ratio data, viewing hours data, quick tune list and a zip code.

The memory 340 may also store the advanced program guide data. The memory 340 may store program guide data that is received from the head end. The program guide data may include amounts of data including two or more weeks of program guide data. The program guide data may be communicated to the user receiving device 250 in various manners including through the satellite 22 of FIG. 1. The program guide data may include content or program identifiers, ratings and various data objects corresponding thereto.

The user receiving device 250 may also include a user interface (UI) 350. The UI 350 may include various types of user interfaces such as a keyboard, push buttons, a touch screen, and a voice activated interface or the like. The UI 350 may be used to: select a channel; change user profiles including acceptable ratings; select various information such as content selections; change the volume; change the display appearance; and/or perform other functions. The UI 350 may also be used for selecting playback locations of the content.

A network interface 352 may be included within the user receiving device 250 to communicate various data through the networks 36, 42 described above. The network interface 352 may be a WiFi, WiMax, WiMax mobile, wireless, cellular, or other types of communication systems. The network interface 352 may use various protocols for communication therethrough including, but not limited to, hypertext transfer protocol (HTTP).

The user receiving device 250 may also include a conditional access module 360. The conditional access module 360 prevents unauthorized reception of the television signals through the antenna 252. The conditional access module 360 may use a cryptographic hash to authorize the use and display of the received signals. The conditional access module 360 may receive the proper codes or signals from the head end.

The user receiving device control module 330 may receive power from a power source 361. The power source 361 may be an alternating current (AC) and/or direct current (DC) power source. The user receiving device control module 330 may operate in standby (or sleep) and active modes. During the active mode the user receiving device control module 330 and the user receiving device 250 consumes more power than in the standby mode. During the standby mode, the user receiving device control module 330 maintains power to certain modules and/or devices to maintain certain operations, as further described below. Other modules and/or devices are deactivated to conserve power during the standby mode. During the active mode, the user receiving device control module 330 may activate and/or provide power to modules and/or devices of the user receiving device 250 that were deactivated during the standby mode. During the active mode, the user receiving device control module 330 and/or the user receiving device 250 may be fully powered. The user receiving device control module 330 may control distribution of power from the power source 361 to the modules and/or devices of the user receiving device control module 330 and/or the user receiving device 250 based on the mode of operation.

The user receiving device control module 330 may also be connected to a Bluetooth module 362. The Bluetooth module 362 may include and/or be implemented as a Bluetooth transceiver. The Bluetooth transceiver may be in communication with mobile devices (e.g., the mobile devices 31 of FIG. 1), as described in more detail below. The user receiving device control module 330 may transition between the standby and active modes based on signals transmitted between the user receiving device control module 330 and the mobile devices.

The user receiving device control module 330 may also include an infrared or radio frequency transceiver 364 for communication with a remote control device 366. The remote control device 366 may be used to, for example, change a channel of the user receiving device 250. The remote control device 366 may also be used to, for example, resume viewing of a channel and/or a video, as is further described below. The remote control device 366 may include a keypad 368 for generating key signals that are communicated to the user receiving device 250. The remote control device 366 may also include a microphone 370 for receiving an audible signal and converting the audible signal to an electrical signal. The electrical signal may be communicated to the user receiving device 250. The remote control device 366 may also include a display 372.

Figure 4:
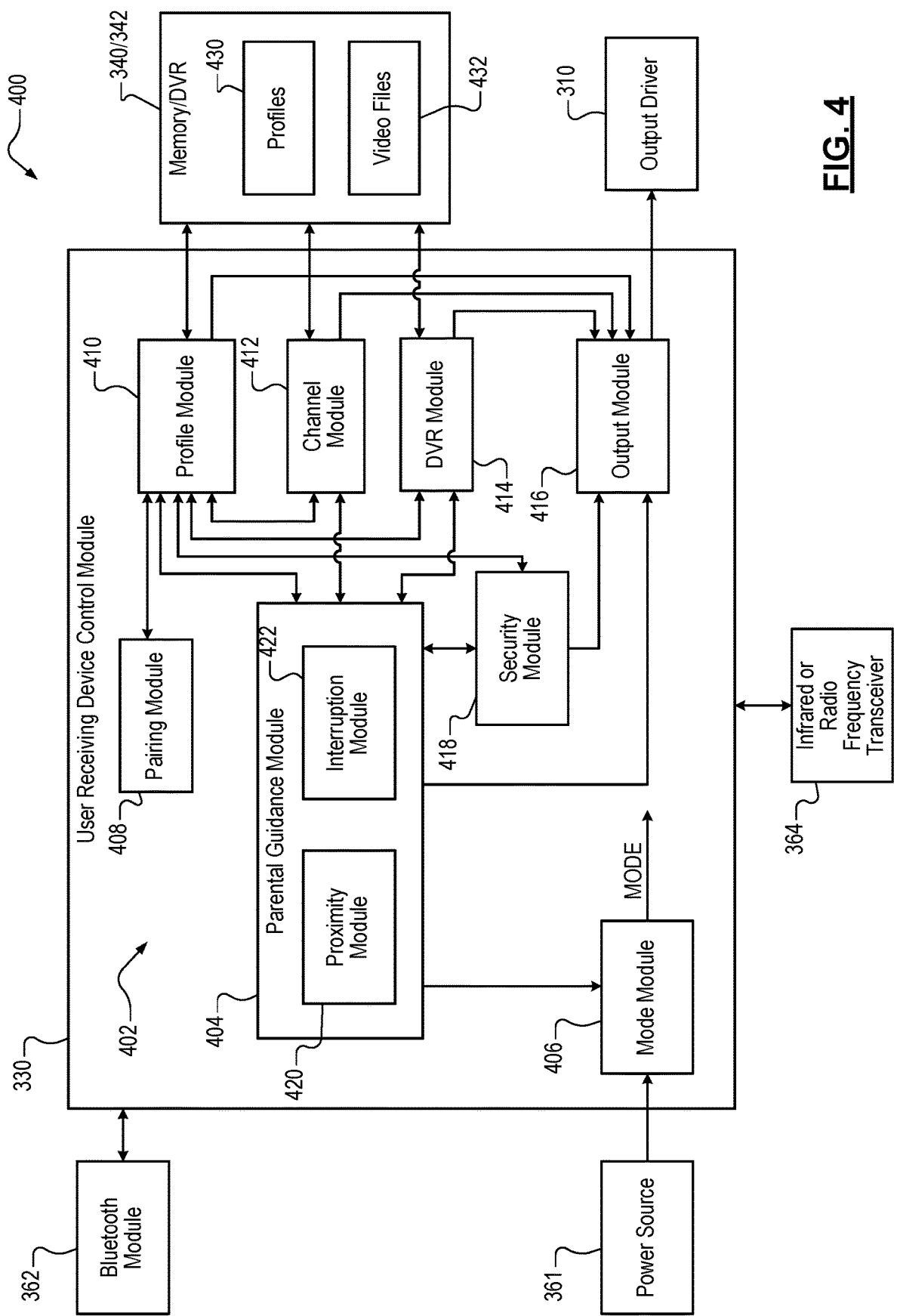
FIG. 4 is a functional block diagram of a control module of the user receiving device of FIG. 3.

FIG. 4 shows a portion 400 of a user receiving device (e.g., one of the user receiving devices 30, 250 disclosed above). The portion 400 includes the output driver 310, the user receiving device control module 330, the power source 361, the Bluetooth module 362, and the transceiver 364. The portion 400 also includes the memory 340 and the DVR 342, which are shown collectively as memory/DVR 340/342. The user receiving device control module 330 includes a parental guidance system 402. The parental guidance system 402 includes a parental guidance module 404, a mode module 406, a pairing module 408, a profile module 410, a channel module 412, a DVR module 414, an output module 416 and a security module 418.

The parental guidance module 404 includes a proximity module 420 and an interruption module 422. The proximity module 420 detects and/or monitors proximity of mobile devices within a proximity of the user receiving device. The proximity module 420 may transmit and/or receive Bluetooth signals via the Bluetooth module 362. This may include beacons, responses and/or other Bluetooth signals. The Bluetooth signals may be transmitted between the Bluetooth module 362 and/or one or more Bluetooth modules of one or more mobile devices (e.g., the mobile devices 31 of FIG. 1). The interruption module 422, based on the detection and/or proximity of the mobile devices may interrupt displaying of a channel, program and/or video. This may include delaying, pausing and/or recording a program and/or video for resumed "play out" at a later time. This is further described below.

The mode module 406 sets an operating mode to be, for example, a standby mode or an active mode. The mode module 406 may receive power from the power source 361 and supply power to the modules of the user receiving device control module 330 based on the operating mode. This may be based on proximity of the detected mobile devices. For example, the mode module 406 may transition to the active mode when a mobile device is detected and/or is in a predetermined range of the user receiving device. The mode module 406 may generate a mode signal MODE indicating the operating mode. The mode signal MODE may be provided to any of the modules of the user receiving device control module 330 and/or any of the modules and/or devices of the user receiving device. During the standby mode, the Bluetooth module 362, the mode module 406, the parental guidance module 404, the proximity module 420, and the interruption module 422 may remain active while other modules (e.g., modules 408, 410, 412, 414, 416, 418) of the user receiving device control module 330 and other modules and/or devices (e.g., tuners 320, demodulators 322, decoders 324, interfaces 350, 352, output driver 310, etc.) of the user receiving device may be deactivated. Certain modules (e.g., one or more of the modules 410, 412, 414, 416) may remain active during the standby mode if, for example, a channel or video is being provided from the user receiving device to a display.

The pairing module 408 pairs one or more mobile devices to the user receiving device. This may include performing a handshake process including transmission of Bluetooth signals between the user receiving device and the mobile devices to pair the mobile devices to the user receiving device. This process may include the user receiving device and the mobile devices detecting each other and transferring identification information to enable communication between the user receiving device and the mobile devices.

The profile module 410 manages profiles 430 of each of the mobile devices. The profiles 430 may be stored in the memory 340 and accessed by the profile module 410. Each of the profiles 430 may have a unique identifier (ID) number, an assigned security level, and corresponding authorized channels, programs and/or videos. The security level may indicate which channels, programs, and/or videos are permitted to be displayed for the corresponding profile. Different profiles may have the same security level or different security levels. One or more mobile devices may be assigned to a profile and thus have a corresponding profile ID number. Each of the profiles may also include mobile device and/or profile specific features such as volume levels, maximum volumes, amount of time permitted ON over a predetermined period, a playlist of recorded videos, a preferred channel list, and other features. The profile module 410 may create each of the profiles 430 based on: parental control inputs; operation history of the corresponding mobile devices; time of day of watching a channel, program and/or video; and/or profile information provided by the corresponding mobile devices.

The channel module 412 may control selection and output of channels to the output driver 310 via the output module 416. The DVR module 414 may control selection, recording, and/or output of videos. The DVR module 414 may store videos in the DVR 342 and output the videos via the output module 416 to the output driver 310 for display. The channel module 412 and the DVR module 414 may operate based on parental guidance signals received from the parental guidance module 404. The channel module 412 and the DVR module 414 may provide channels and/or videos to the output module based on the profile ID number and/or the security level associated with a profile of one or more mobile devices. The videos may be stored as video files 432 in the memory 340 and/or DVR 342.

The output module 416 controls output of channels, programs, and/or videos to the output driver 310. This may be based on parental guidance signals received from the parental guidance module 404. The output module 416 may output channels and/or videos to the output driver 310 based on the profile ID number and/or the security level associated with a profile of one or more mobile devices.

The security module 418 may control operation of the output module 416 based on a security level of a profile. The security module 418 may also be used to set passcodes and/or require a passcode to view certain channels, programs and/or videos. The security module 418 may be in communication with the mobile devices via the Bluetooth module 362 and/or other interface and/or transceiver. The security module 418 may also request a passcode in order to resume viewing of a channel, program and/or video interrupted by the interruption module 422.

The interruption module 422 and/or the security module 418 may receive signals from the mobile devices and/or the remote control to resume playing of a program and/or video interrupted by the interruption module 422. This may include receiving a response signal and/or a passcode.

FIG. 5 shows a mobile device 450. Any of the mobile devices of FIG. 1 may be configured as the mobile device 450. The mobile device 450 may be a mobile device of a parent or a child. The mobile device 450 includes a mobile device control module 452 that controls various functions of the mobile device 450. The mobile device control module 452 includes a second parental guidance system 453 that includes a parental guidance module 454, a mode module 456, a pairing module 458, a profile module 460, an output module 462 and a security module 464.

The parental guidance module 454 includes a proximity module 466 and an interruption module 467. The proximity module 466 detects and/or monitors proximity of mobile devices within a proximity of a user receiving device. The proximity module 466 may transmit and/or receive Bluetooth signals via a Bluetooth module 470 connected to the mobile device control module 452. This may include beacons, responses and/or other Bluetooth signals. The Bluetooth signals may be transmitted between the Bluetooth module 370 and/or one or more Bluetooth modules of one or more user receiving device s (e.g., the user receiving device s 30, 250 of FIGS. 1 and 3). The interruption module 467 may receive interrupt signals from a user receiving device and respond to the interrupt signals to, for example, resume viewing a channel, program and/or video.

The mode module 456 may transition between operating in a standby mode and an active mode based on signals from the parental guidance module 454 and/or the proximity module 466. For example, the mode module 456 may transition to the active mode when a user receiving device is detected and/or is in a predetermined range of the mobile device 450. The mode module 456 may generate a mode signal MODE2 indicating the operating mode. The mode signal MODE2 may be provided to any of the modules of the mobile device control module 452 and/or any of the modules and/or devices of the mobile device 450. During the standby mode, the Bluetooth module 470, the mode module 456, the parental guidance module 454, and the proximity module 466 may remain active while other modules (e.g., modules 458, 460, 462, 464) of the mobile device control module 452 and other modules and/or devices (e.g., microphone 455, user interfaces 457, network interface 459, display 472, etc.) of the mobile device 450 may be deactivated. The mode module 456 may receive power from a power source 473 and supply power to the modules of the mobile device control module 452 based on the operating mode.

The pairing module 458 pairs the mobile device 450 to one or more user receiving devices. This may include performing a handshake process including transmission of Bluetooth signals between the mobile device 450 and the user receiving devices to pair the mobile device 450 to the user receiving devices. This process may include the mobile device 450 and the user receiving devices detecting each other and transferring identification information to enable communication between the mobile device 450 and the user receiving devices.

The profile module 460 manages profiles 480 of the mobile device 450 and/or other mobile devices. The profiles 480 may be stored in memory 482 and accessed by the profile module 460. The profiles 480 may have respectively a unique ID, an assigned security level, and corresponding authorized channels, programs and/or videos. The profile ID may be assigned by a user receiving device. The security level may be assigned by the mobile device 450 or another mobile device (e.g., parental device) and/or a user receiving device. The security level may indicate which channels, programs, and/or videos are permitted to be displayed for the corresponding profile. Each of the profiles may also include mobile device and/or profile specific features such as volume levels, maximum volumes, time permitted ON over a predetermined period, a playlist of recorded videos, a preferred channel list, and other features. The profile module 460 may create the profiles 480 based on parental control inputs, operation history of the corresponding mobile devices, and/or profile information provided by the corresponding mobile devices. As an alternative the profile module 460 may receive one or more of the profiles 480 from a user receiving device. A profile module 460 may store user profile data within the mobile device 450. The profile module 460 may store user settings, such as favorites and parental controls. The profile module 460 may also receive profile data from the head end 12.

The output module 462 controls output of signals, guides, channels, programs, and/or videos to the display 472. Although not shown, the mobile device control module 452 may include guide, channel, program, and/or video modules for the accessing and/or displaying respectively of guides, channels, programs, and/or videos. The output control of the output module 462, may be based on parental guidance signals received from the parental guidance module 454. The output module 462 may output signals, guides, channels, programs, and/or videos to the display 472 based on the profile ID and/or the security level associated with the profile 480.

The security module 464 may control operation of the output module 462 based on a security level of the profile 480. The security module 464 may also be used to set passcodes and/or require a passcode to view certain channels, programs and/or videos. The security module 464 may be in communication with user receiving devices via the Bluetooth module 470. The security module 464 may also request a passcode in order to resume viewing of a channel, program and/or video interrupted by an interruption module (e.g., the interruption module 422 of FIG. 4) of a user receiving device.

In one implementation the mobile device 450 may be used as a remote control device and send a response signal to a user receiving device to resume viewing of a channel, program and/or video. In another embodiment, the security module 464 provides a passcode, which may be entered by a user of the mobile device 450.

The mobile device control module 452 is in communication with the microphone 455 that receives audible signals and converts the audible signals into electrical signals. The audible signals may include a request signal. The request signal may be to perform a search and/or to obtain guide data, network data and/or playlist data. The mobile device control module 452 is also in communication with the user interface 457. The user interface 457 may include buttons, input switches and/or a touch screen.

The mobile device control module 452 is also in communication with a network interface 459. The network interface 459 may be used to interface with the network 42 of FIG. 1. As mentioned above, the network 42 may be a wireless network or the Internet. The network interface 459 may communicate with a cellular system or with the internet or both. A network identifier may be attached to or associated with each communication from the mobile device 450.

The following FIGS. 6-11 show various windows. The windows may be displayed; by a user receiving device on a television (or display) connected to the user receiving device; on a mobile device; and/or on a remote control device. Various examples of the user receiving device, the mobile device and the remote control device are described herein. Buttons, areas, values, slides, and/or other controls shown in the windows may be pressed, clicked on, changed, and/or slid via the mobile device and/or the remote control device.

Figure 6:
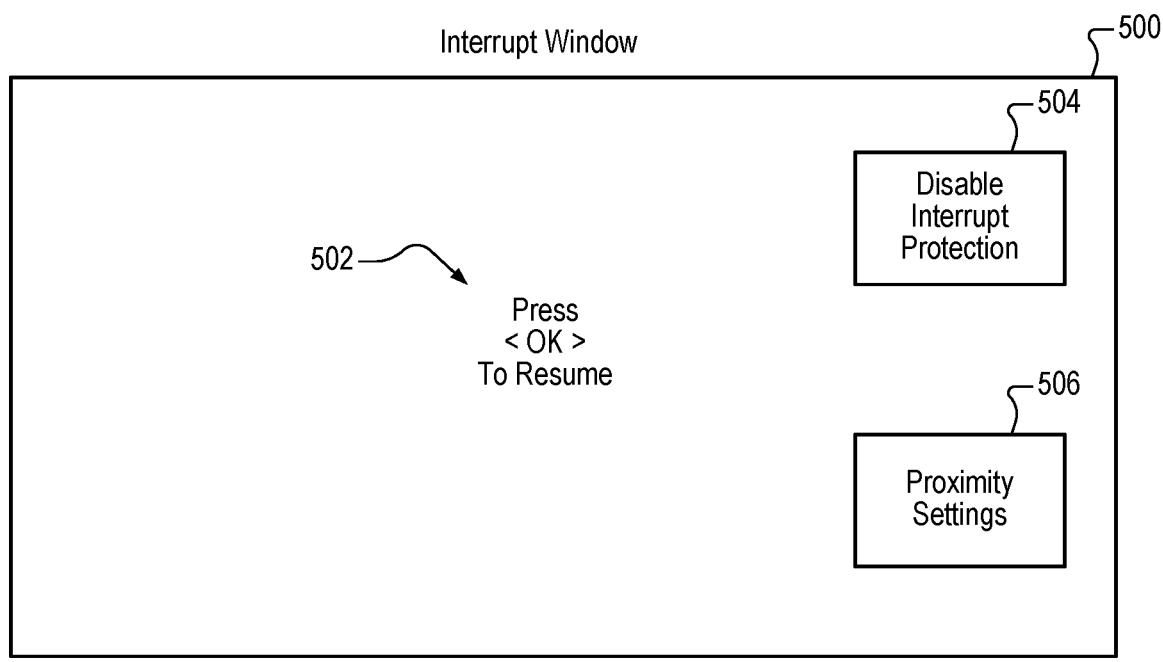
FIG. 6 is an interrupt window in accordance with the present disclosure.

FIG. 6 shows an interrupt window 500. The interrupt window 500 (may be referred to as an interrupt display screen). The interrupt widow 500 may be displayed by the interruption module 422 of FIG. 4. The interrupt window 500 may have a blank (or black) background and may include a resume message 502, such as "Press <OK > to resume", as shown. As an example, a parent or user associated with a mobile device that has a security level high enough (greater than or equal to a predetermined security level) to resume viewing may then press OK (or other button) on the remote control device 366 and/or mobile device. The user may also or alternatively have a signal sent from the remote control device 366 and/or the mobile device to the user receiving device. The signal may be sent to the interruption module 422 and/or corresponding user receiving device.

The interrupt window 500 may also include a disable interrupt protection button 504. The user may, for example, click on arrows to navigate over and highlight (or drag a cursor over) the disable interrupt protection button 504 and click OK to disable interrupt protection. This may resume viewing of a channel, program and/or video and prevent further interruptions. As an example, the disable interrupt protection may be reenabled by opening a mobile device specific settings window, such as that shown in FIG. 10, and clicking on the enable interrupt protection button. The interrupt protection may be enabled by an adult or user having a mobile device with a security level high enough (greater than or equal to a predetermined security level) to enable interrupt protection.

Figure 7:
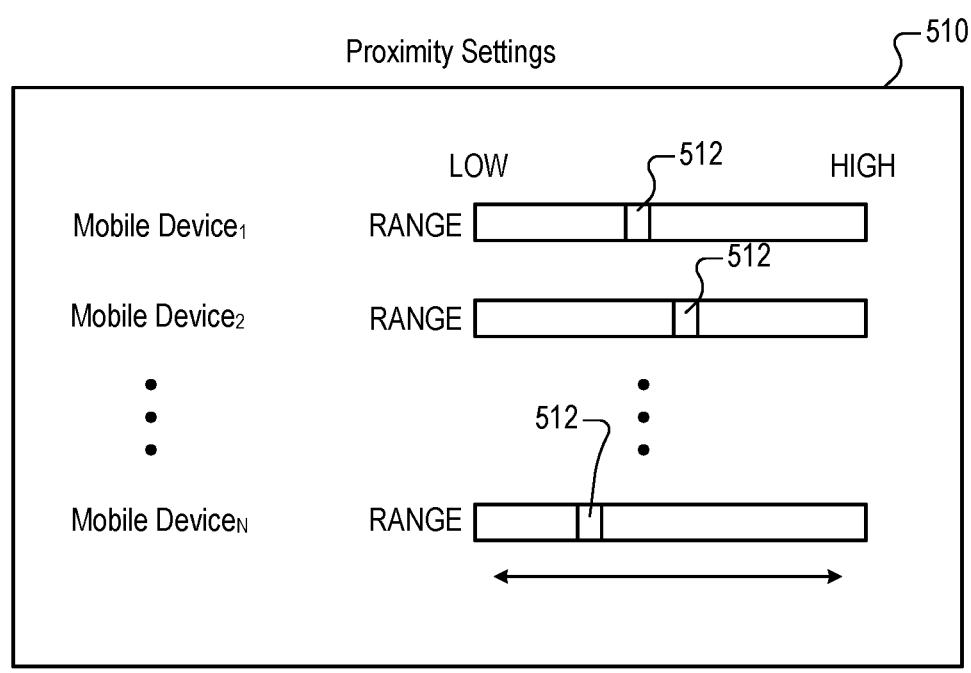
FIG. 7 is a proximity settings window in accordance with the present disclosure.

The interrupt window 500 may also include a proximity settings button 506, which may be clicked on to open a proximity settings window 510, as shown in FIG. 7. FIG. 7 shows a proximity settings window 510. The proximity settings window 510 (may be referred to as a proximity settings display screen). The proximity settings window 510 lists mobile devices and corresponding range settings for the mobile devices. The range settings may correspond to received signal strength indicator (RSSI) values. If a signal strength of a mobile device as detected by a user receiving device is greater than or equal to a received signal strength indicator value corresponding to the range set for the mobile device, then the mobile device is within range for the user receiving device to perform certain tasks. The tasks may include: accessing a profile associated with the user receiving device; operating according to the profile; adjusting parameters and/or settings according to the profile; and/or displaying an interruption window (e.g., the interruption window of FIG. 6) on a television (or display) connected to the user receiving device and/or on a display of the mobile device. The range settings are shown as slides 512 having set positions. The slides 512 may be moved to the left or right to adjust the ranges. The lower the range the closer a mobile device needs to come to a user receiving device in order for the user receiving device to react and perform one or more of the stated tasks.

Figure 8:
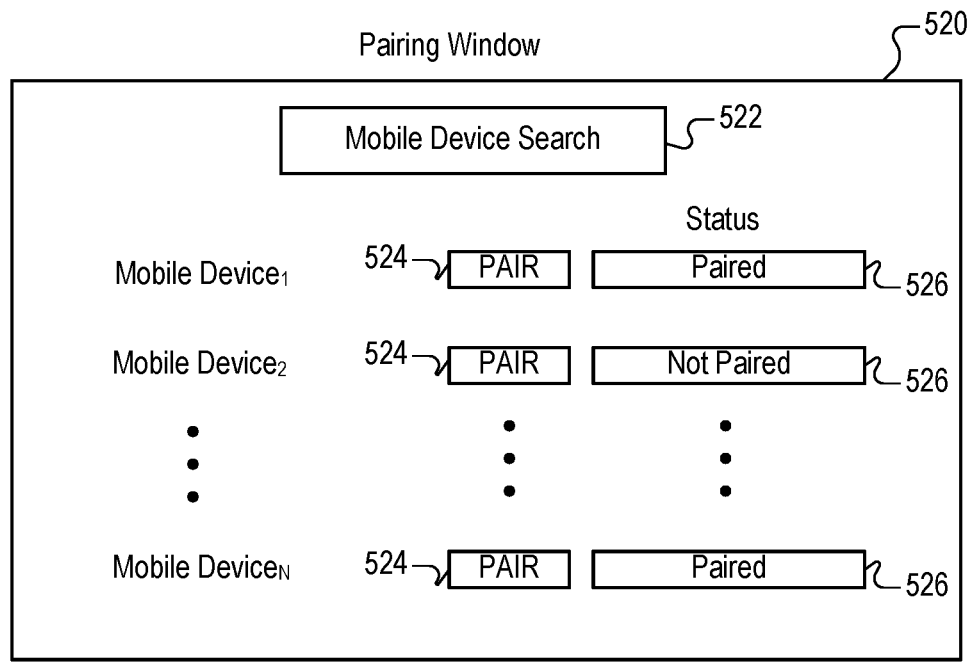
FIG. 8 is a pairing window in accordance with the present disclosure.

FIG. 8 shows a pairing window 520. The pairing window 520 (may be referred to as a pairing display screen). The pairing window 520 lists mobile devices and indicates whether the mobile devices are paired to a user receiving device. The pairing window 520 may be opened to discover and pair mobile devices to a user receiving device. This may be done via a remote control device and/or a mobile device paired to the user receiving device. The pairing window 520 may include a mobile device search button 522, which may be clicked on to discover mobile devices within a predetermined area of the user receiving device. The pairing window 520 may include pairing buttons 524 for initiating pairing between the mobile devices and the user receiving device. Status bars 526 are shown that indicated whether the corresponding mobile device is paired with the user receiving device.

Figure 9:
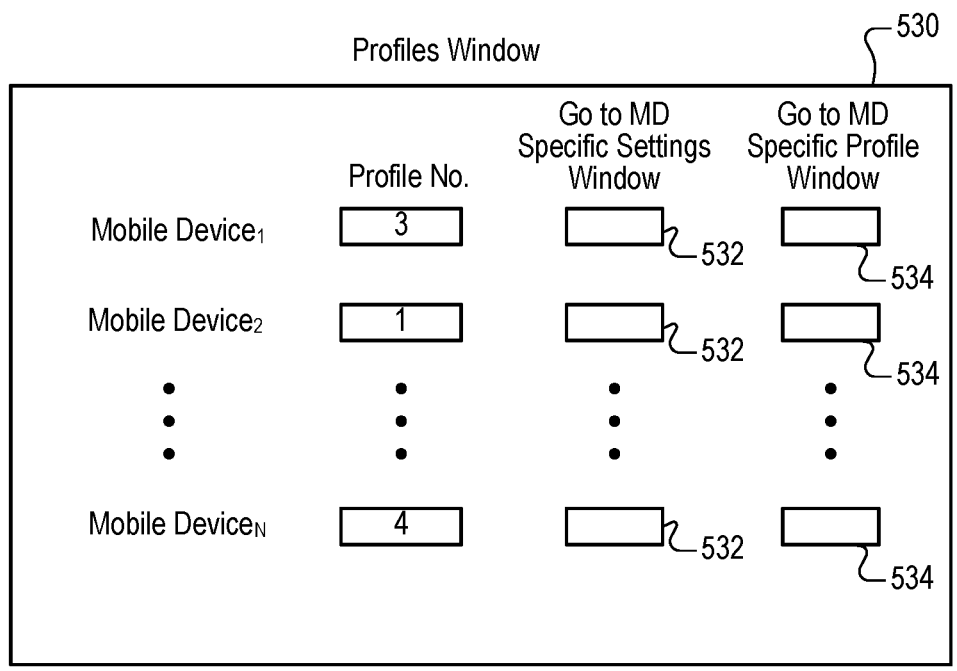
FIG. 9 is a profiles window in accordance with the present disclosure.

FIG. 9 shows a profiles window 530. The profiles window 530 (may be referred to as a profiles display screen). The profiles window 530 lists mobile devices and indicates corresponding profiles values of profiles of the mobile devices. Buttons 532 may be provided to open respective mobile device specific setting windows (e.g., the mobile device specific setting window of FIG. 10 for each of the mobile devices. Buttons 534 may also be provided to open respective mobile device specific profile windows (e.g., the mobile device specific profile window of FIG. 11) of the mobile devices.

Figure 10:
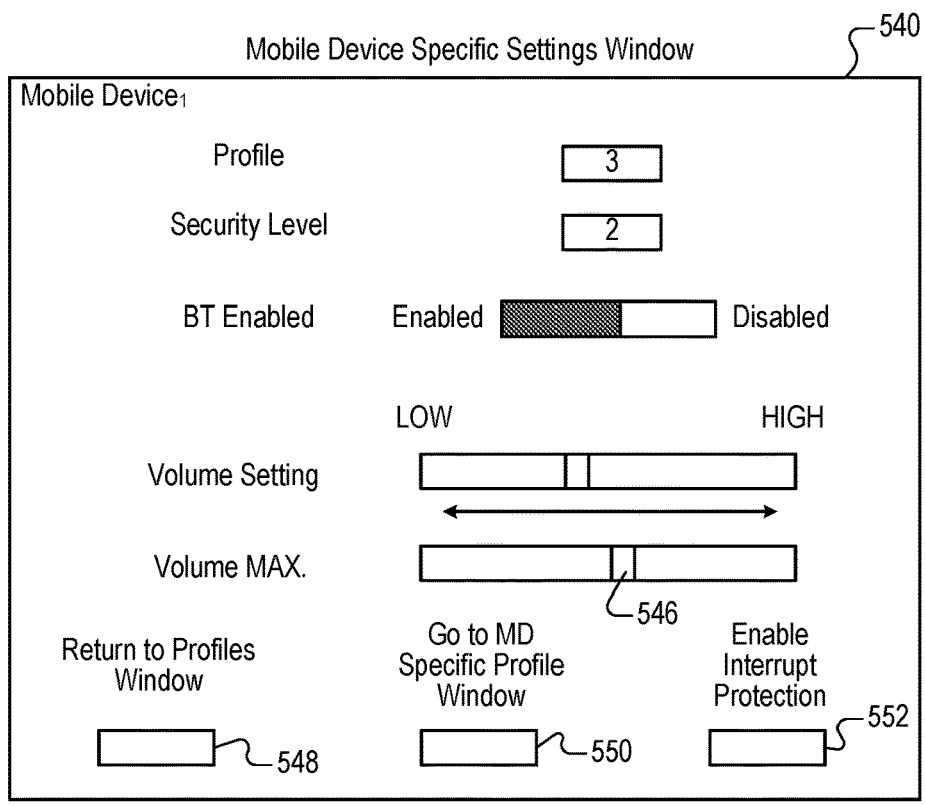
FIG. 10 is a mobile device specific settings window in accordance with the present disclosure.

FIG. 10 shows a mobile device specific settings window 540. Although shown separately, the mobile device specific settings window 540 and/or the settings included in the mobile device specific settings window 540 may be included in a profile specific window (e.g., the profile specific window of FIG. 11). The mobile device specific settings window 540 (may be referred to as a mobile device specific settings display screen). The mobile device specific settings window 540 may include settings specific to a mobile device. The mobile device specific settings window 540 may include, for example: a profile number; a security level; a Bluetooth enable slide 542; a volume setting slide 544; a volume maximum setting slide 546; a return to profiles window button 548; a go to mobile device specific profile window button 550, and an enable interrupt protection window button 552. The mobile device specific settings window 540 may include other mobile device specific settings now shown in FIG. 10.

The mobile device specific settings window 540 may be for a first mobile device and accessed by the first mobile device or a second mobile device. The second mobile device may be, for example, a parent device and the first mobile device may be a child device. The second mobile device may have a security level above a predetermined level to permit access to and to permit changing of the settings of the first mobile device. In one embodiment, the first mobile device may have access to but may not be able to change one or more of the settings. The security level of the first mobile device may be less than the predetermined security level. The second mobile device may access the mobile device specific settings window 540 via communication with the user receiving device or a headend.

Figure 11:
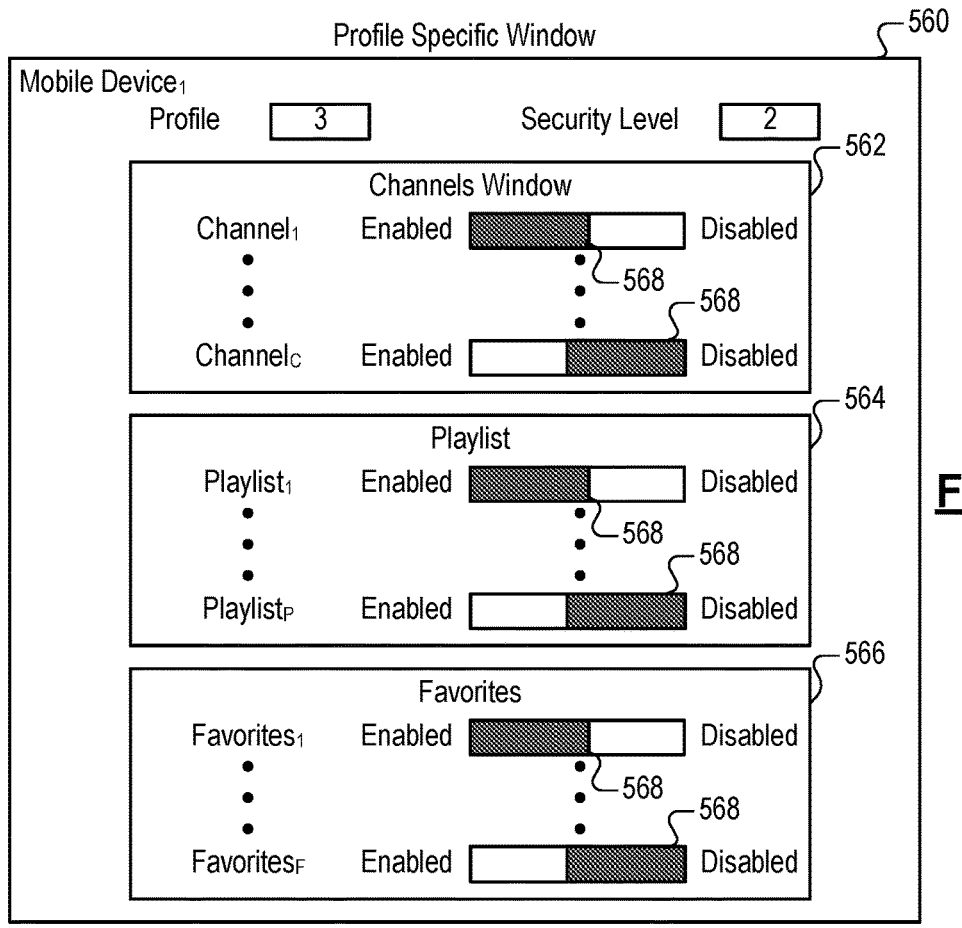
FIG. 11 is a profile specific window in accordance with the present disclosure.

FIG. 11 shows a profile specific window 560. The profile specific window 560 (may be referred to as a profile specific display screen). The profile specific window 560 may indicate the profile number and/or the security level of a corresponding mobile device. The profile specific window 560 may include a channels window 562, a playlist window 564, and a favorites window 566. The channel window 562 may list channels 568 enabled for the corresponding mobile device. The playlist window 564 may list recordings enabled for and/or stored by the corresponding mobile device. The favorites window 566 may list favorites, such as channels, programs, and/or videos preferred by a user of the corresponding mobile device. Slides 568 may be provided for each item listed in the windows 562, 564, 566 to allow, for example, a parent to enable or disable each of the items, as shown.

The profile specific window 560 may be for a first mobile device and accessed by the first mobile device or a second mobile device. The second mobile device may be, for example, a parent device and the first mobile device may be a child device. The second mobile device may have a security level above a predetermined level to permit access to and/or changing of the settings in the profile of the first mobile device. In one embodiment, the first mobile device may have access to but may not be able to change one or more of the settings in the profile specific window 560. The security level of the first mobile device may be less than the predetermined security level. The second mobile device may access the profile specific window via communication with the user receiving device or a headend.

The systems disclosed herein may be operated using numerous methods, example methods are illustrated in FIGS. 12-15. Each of the methods may be performed while one or more of the other methods are being performed. Although the following tasks of FIGS. 12-15 are primarily described with respect to the implementations of FIGS. 1-11, the tasks may be easily modified to apply to other implementations of the present disclosure. The tasks of each of FIGS. 12-15 may be iteratively performed.

Figure 12:
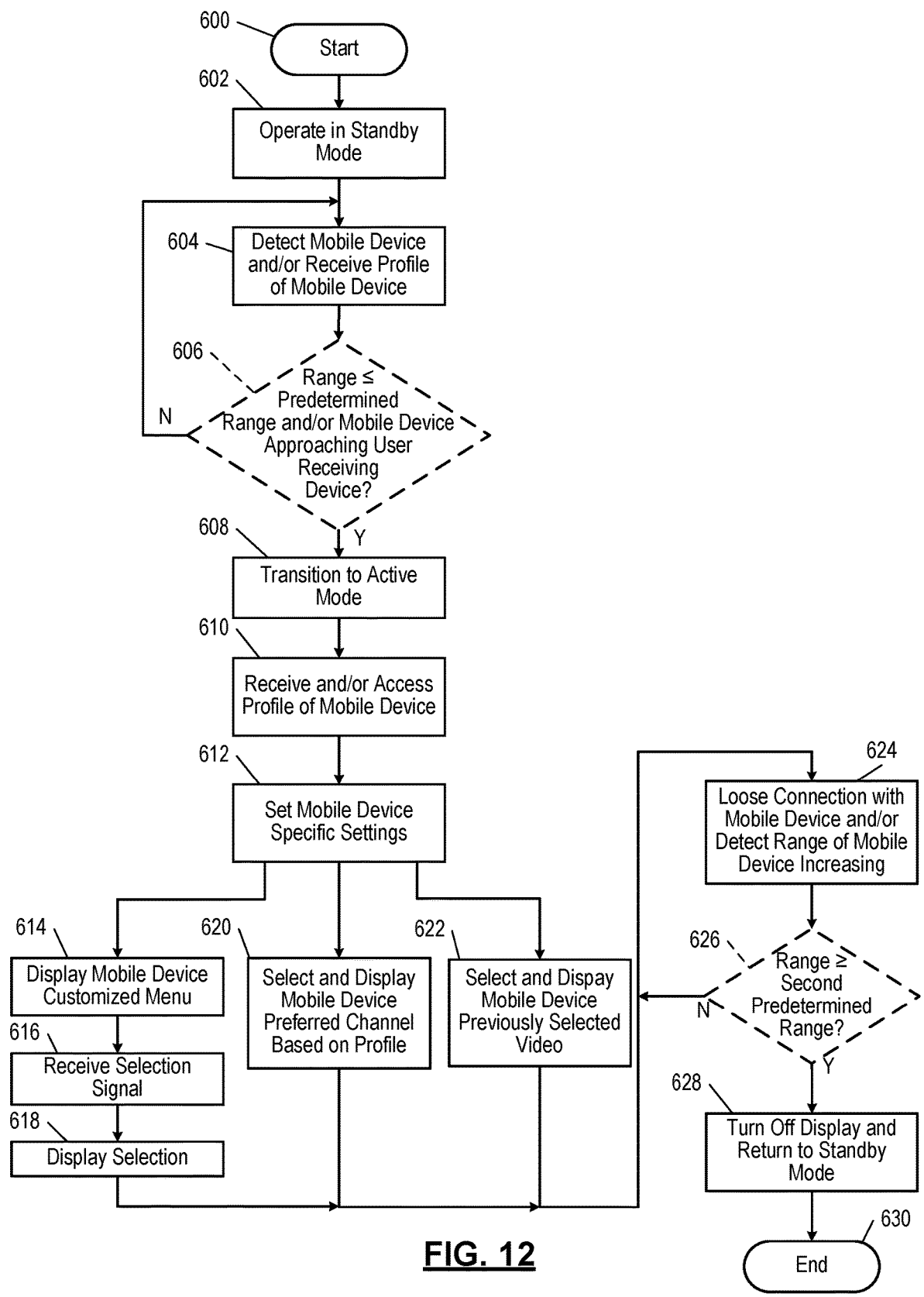
FIG. 12 illustrates a method of operating a user receiving device in accordance with the present disclosure.

In FIG. 12, a method of operating a user receiving device (e.g. one of the user receiving devices 30, 250 described above) is shown. The tasks of FIG. 12 may be performed by a control module and/or other modules of the user receiving device. Also, the signals transmitted in the following tasks between the stated mobile device(s) and user receiving device(s) may be Bluetooth signals.

The method may begin at 600. At 602, the user receiving device may be operated in a standby mode. This may include monitoring signals (e.g., beacons or discovery signals) received from mobile devices. This may also or alternatively include periodically transmitting beacons and/or discovery signals to discover mobile devices in a predetermined area of the user receiving device.

At 604, a proximity module of the user receiving device detects a mobile device in proximity to and/or approaching the user receiving device and generates a first proximity signal. The mobile device may have entered a building (e.g., a residential home) and/or a room that the user receiving device is in. This may include transferring Bluetooth signals, such as beacons, discovery signals and/or response signals between the mobile device and the user receiving device. The mobile device may transmit a unique ID, a profile and/or settings specific to the mobile device to the user receiving device or the profile and the settings may be pre-stored in the user receiving device. The profile may be mobile device specific and/or user specific. For example, multiple users of a mobile device may have different profiles and corresponding user IDs, profile numbers and/or security levels. The mobile device may be paired with the user receiving device prior to performing the method of FIG. 12.

At 606, the proximity module of the user receiving device may determine range of the detected mobile device and/or whether the mobile device is approaching the user receiving device and generates a second proximity signal. This may include determining a received signal strength indicator value for strength (or power) of a radio signal received from the mobile device. This may be strength of a beacon, discovery signal, or a response signal received from the mobile device. If the range of the mobile device from the user receiving device is less than or equal to a predetermined range (i.e. within the predetermined range) and/or the received signal strength indicator value is less than or equal to a predetermined value, then task 608 may be performed. The proximity module may compare previous and current range values and/or determine a rate at which the range is changing to determine whether the mobile device is approaching the user receiving device. If the previous range is greater than the current range, than the mobile device is approaching the user receiving device. If the rate is slowing down or negative, than the mobile device may not be approaching and/or may be moving away from the user receiving device. In one implementation, task 606 is skipped.

At 608, the mode module of the user receiving device, based on the first proximity signal and/or the second proximity signal, transitions to the active mode subsequent to task 604 and/or based on results of task 606. The results of task 606 may be transmitted from the proximity module to the mode module. Task 608 may be performed prior to task 606. At 610, if not already accessed or received, the user receiving device may access and/or receive the profile of the mobile device.

At 612, the user receiving device may turn on a display (or television) and set mobile device specific settings, such as volume. At 614, the user receiving device may display a mobile device specific guide customized to the mobile device including a listing of channels, programs, and/or videos in an arrangement and/or order specific to and/or arranged by the mobile device. At 616, the mobile device may transmit a selection signal to the user receiving device indicating a channel, program and/or video to display. At 618, the selection may then be displayed on the display by the user receiving device.

At 620, the user receiving device may automatically select and display a channel, program and/or video preferred by a user of the mobile device. This may include automatically tuning to a particular channel. The selection may be based on the profile and/or based on previous user behavior. As an example, percentages of time that the user watches certain channels, programs and/or videos may be stored and the channel, program and/or video with the highest watch time may be selected. As another example, if a user typically watches a certain channel, program and/or video when initially turning on a display that channel, program and/or video may be selected. The user via the mobile device may enable or disable automatic selection by the control module, profile module, channel module, DVR module, and/or output module of the user receiving device. The enabling and disabling of this automatic selection may be done via, for example, the mobile device specific settings window. If disabled, task 614 may be performed instead of task 620, otherwise task 620 may be performed.

At 622, the user receiving device may display a video previously paused by the mobile device to allow the user of the mobile device to resume viewing where previously left off. The actions performed at 612, 614, 616, 618, 620, and 622 by the user receiving device may be based on the profile of the mobile device.

Tasks 624-628 may be performed subsequent to tasks 618, 620, 622. At 624, the proximity module may detect the mobile device leaving a room. This may include detecting a range of the mobile device increasing and/or a received signal strength indicator value decreasing. At 626, if the range of the mobile device from the user receiving device is greater than or equal to a second predetermined range (i.e. within the second predetermined range) and/or the received signal strength indicator value is greater than or equal to a second predetermined value, then task 628 may be performed. The second predetermined range may be less than, equal to or greater than the first predetermined range used at 606. The second predetermined value may be less than, equal to or greater than the first predetermined value used at 606. In one embodiment, the second predetermined range is greater than the first predetermined range and the second predetermined value is greater than the first predetermined value.

At 628, the mode module of the user receiving device may transition to the standby mode including deactivating (or powering OFF) the display. If a channel, program and/or video was being displayed, the corresponding program and/or video may be recorded for later recall and playback by the mobile device for the user. The method may end at 630.

Although the method of FIG. 12 is described with respect to a single mobile device, the method may be modified for multiple mobile devices. The user receiving device may detect multiple mobile devices and arbitrate the profiles and security levels associated with the mobile devices and select a profile and security level appropriate for all of the mobile devices. The user receiving device may, for example, operate in "family mode", such that a family profile and security level are selected. During the family mode, channels, programs and videos that can be viewed by users of all of the mobile devices are permitted to be viewed on the display connected to the user receiving device. The channels, programs and/or videos may be family appropriate. For example, the mobile device and/or user (e.g., child) with the lowest security level may dictate that which is permitted to be viewed on the display. A mobile deice and/or user (e.g., parent) with a highest security level may override the security level selected by the user receiving device. This may include the mobile device with the highest security level sending an override signal to the user receiving device. As an alternative, the mobile device and/or user (father or mother of a family) with the highest security level may be given highest priority and dictate which channels, programs and/or videos are permitted to be watched. Guide preferences and/or settings of the user receiving device may be based on the profile of the mobile device and/or user with the highest security level.

Figure 13:
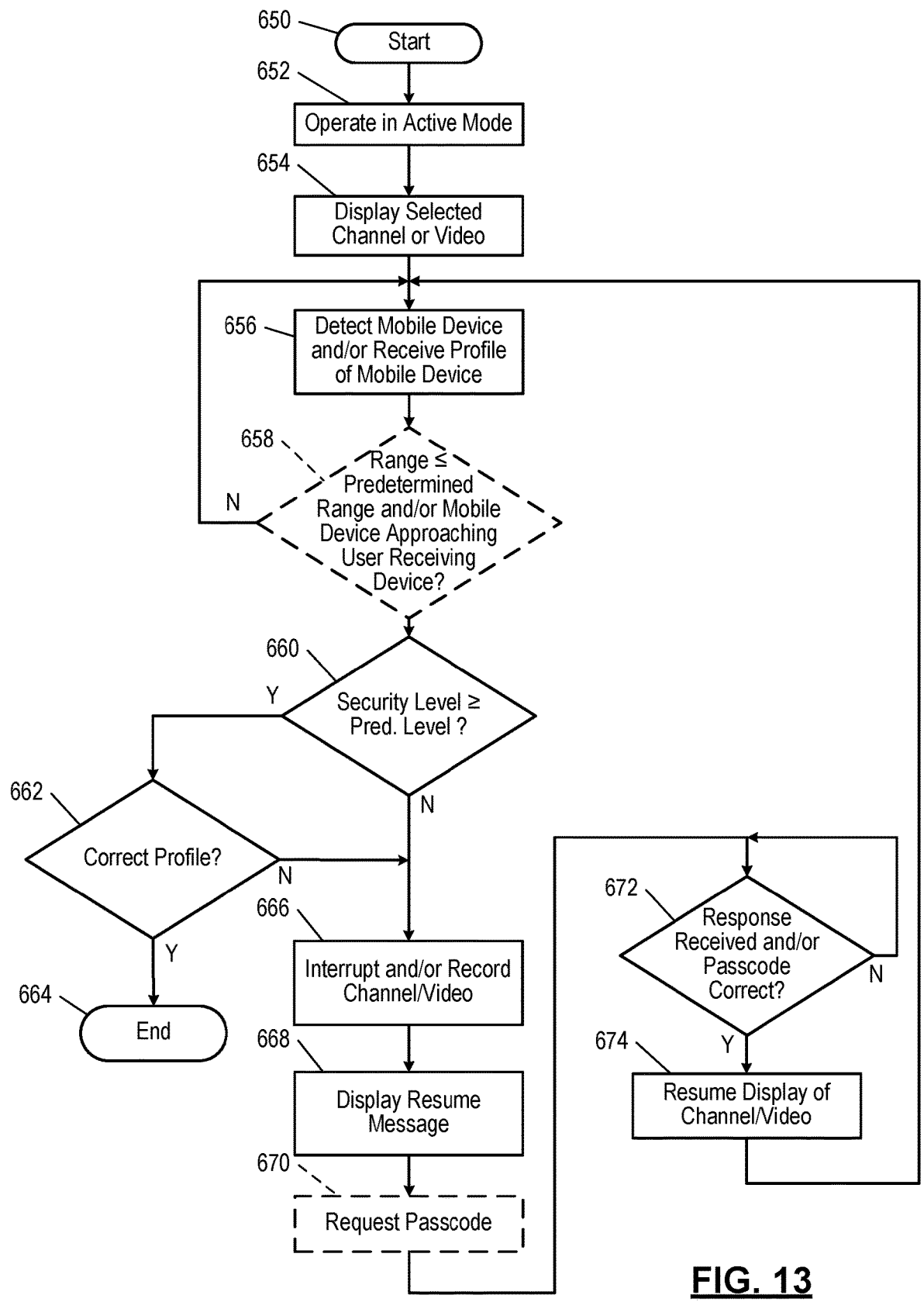
FIG. 13 illustrates a method of operating a user receiving device in accordance with the present disclosure.

In FIG. 13, a method of operating a user receiving device is shown. The tasks of FIG. 13 may be performed by a control module and/or other modules of the user receiving device. Also, the signals transmitted in the following tasks between the stated mobile device(s) and user receiving device(s) may be Bluetooth signals.

The method may begin at 650. At 652, the user receiving device may be operating in and/or transition to the active mode. At 654, the user receiving device may display a selected channel, program and/or video (referred to as the selection). This selection may be selected by a first mobile device and/or remote control device. The user of the first mobile device and/or a remote control device may have a security level and/or profile number associated with allowing viewing of the selection. The user may enter a passcode, user specific unique ID number and/or user specific unique password (collectively referred to as security information) in the first mobile device and/or remote control device to access a corresponding profile and/or to permitting viewing of the selection. The security information may be provided to the user receiving device and authorized by the user receiving device prior to the user receiving device permitting viewing of the selection. The selection may contain adult content and/or content to be viewed by viewers of mobile devices having a security level greater than or equal to a predetermined security level.

Parental guidance sensing may include, for example, the following tasks 656 and 658. At 656, the user receiving device detects a second mobile device (e.g., a mobile device of a child) in proximity to and/or approaching the user receiving device and generates a first proximity signal. The second mobile device may have a security level below the predetermined security level described at 654. This may include transfer of Bluetooth signals, such as beacons, discovery signals and/or response signals between the second mobile device and the user receiving device. The second mobile device may transmit a unique ID, profile and/or settings specific to the second mobile device to the user receiving device or the profile and the settings may be pre-stored in the user receiving device. For example, multiple users of a second mobile device may have different profiles and corresponding user IDs, profile numbers and/or security levels. The second mobile device may be paired with the user receiving device prior to performing the method of FIG. 13.

At 658, a proximity module of the user receiving device may determine range of the detected second mobile device and/or whether the second mobile device is approaching the user receiving device and generates a second proximity signal. This may include determining a received signal strength indicator value for strength (or power) of a radio signal received from the second mobile device. This may be strength of a beacon, discovery signal, or a response signal received from the second mobile device. If the range of the second mobile device from the user receiving device is less than or equal to a predetermined range (i.e. within the predetermined range) and/or the received signal strength indicator value is less than or equal to a predetermined value, then task 660 may be performed. The proximity module may compare previous and current range values and/or determine a rate at which the range is changing to determine whether the second mobile device is approaching the user receiving device. If the previous range is greater than the current range, than the mobile device is approaching the user receiving device. If the rate is slowing down or negative, than the mobile device may not be approaching and/or may be moving away from the user receiving device. In one implementation, task 658 is skipped.

At 660, the user receiving device, based on the first proximity signal and/or the second proximity signal, may determine whether the second mobile device and/or a user of the second mobile device has a security level greater than or equal to the predetermined security level. If the second mobile device and/or a user of the second mobile device does have a security level greater than or equal to the predetermined security level for the selection being viewed, then task 662 is performed, otherwise task 666 is performed.

At 662, the user receiving device may determine whether the second mobile device and/or user of the second mobile device is assigned to a profile permitted to view the selection and generate a profile determination signal. If the profile number is not correct for the selection being viewed, task 666 is performed, otherwise the method may end at 664. If the profile number is correct, the interrupt module of the user receiving device refrains from generating an interrupt signal. If the method ends, the selection may continue to be viewed on the display.

At 664, an interruption module of the user receiving device interrupts and/or records the selection. The interruption may include stopping and/or pausing play out of the selection. This prevents users that do not have a proper security level and/or profile number to accidentally view the selection by entering a room in which the selection was being displayed.

At 666, the interruption module may display an interruption window (e.g., the interruption window of FIG. 6). At 668 and if not performed at 666, the interruption module displays a resume message (e.g., the message 502 of FIG. 6). This message may be displayed over, for example, a paused screen of the selection or over a blank (or black) screen. At 670, the interruption module or a security module of the user receiving device may request a passcode to resume viewing. In one embodiment, task 670 is not performed.

At 672, if the user receiving device receives a response signal from the first mobile device and/or the remote control device and/or a proper passcode from the first mobile device and/or the remote control device, then task 674 is performed. The user receiving device may detect when an improper passcode is entered multiple times and report this to first mobile device to indicate to the user of the first mobile device the attempts by user of the second mobile device to access the selection. At 674, the user receiving device resumes display of the selection.

Figure 14:
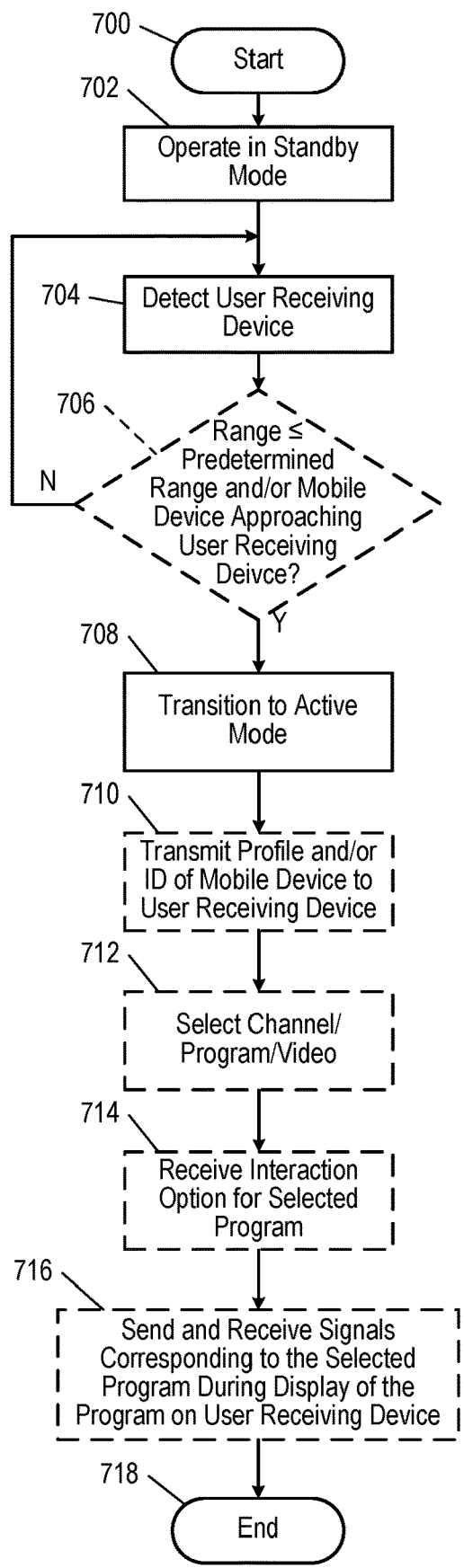
FIG. 14 illustrates a method of operating a mobile device in accordance with the present disclosure.

In FIG. 14, a method of operating a mobile device is shown. The tasks of FIG. 14 may be performed by a control module and/or other modules of the mobile device. Also, the signals transmitted in the following tasks between the stated mobile device(s) and user receiving device(s) may be Bluetooth signals.

The method may begin at 700. At 702, a mobile device may operate in a standby mode and/or transition to a standby mode. The mobile device may be an adult device or a child device. This may include monitoring signals (e.g., beacons or discovery signals) received from user receiving devices. This may also or alternatively include periodically transmitting beacons and/or discovery signals to discover user receiving devices in a predetermined area of the mobile device.

At 704, the mobile device detects a user receiving device in proximity to and/or that the mobile device is approaching and generates a first proximity signal. This may include transfer of Bluetooth signals, such as beacons, discovery signals and/or response signals between the mobile device and the user receiving device. The mobile device may transmit a unique ID, a profile and/or settings specific to the mobile device to the user receiving device or the profile and the settings may be pre-stored in and/or accessed by the user receiving device. The user receiving device may transmit a user receiving device specific (or unique) ID to the mobile device. The profile may be mobile device specific and/or user specific. The mobile device may be paired with the user receiving device prior to performing the method of FIG. 14.

At 706, a proximity module of the mobile device may determine a range of the mobile device from the detected user receiving device and/or whether the mobile device is approaching the user receiving device and generates a second proximity signal. This may include determining a received signal strength indicator value for strength (or power) of a radio signal received from the user receiving device. This may be strength of a beacon, discovery signal, or a response signal received from the user receiving device. If the range of the mobile device from the user receiving device is less than or equal to a predetermined range (i.e. within the predetermined range) and/or the received signal strength indicator value is less than or equal to a predetermined value, then task 708 may be performed. The proximity module may compare previous and current range values and/or determine a rate at which the range is changing to determine whether the mobile device is approaching the user receiving device. If the previous range is greater than the current range, than the mobile device is approaching the user receiving device. If the rate is slowing down or negative, than the mobile device may not be approaching and/or may be moving away from the user receiving device. In one implementation, task 706 is skipped.

At 708, the mode module of the mobile device, based on the first proximity signal and/or the second proximity signal, transitions to the active mode subsequent to task 704 and/or based on results of task 706, which may be transmitted from the proximity module to the mode module. Task 708 may be performed prior to task 706.

One or more of the following tasks 710, 712, 714, 716 may not be performed. The method may end subsequent to any one of tasks 708, 710, 712, 714, 716. At 710, if not already accessed or transmitted, the mobile device may access and/or transmit the profile of the mobile device to the user receiving device. This transmission may include a unique ID of the mobile device.

At 712, the user receiving device may automatically select a channel, program and/or video to display based on the profile of the mobile device and/or user of the mobile device. Alternatively and as shown, the mobile device may select a channel, program and/or video to display via the user receiving device on a display. This may be done manually via a user entering a selection and/or picking a selection via the mobile device.

At 714, the mobile device may receive an interaction option signal from the user receiving device indicating that the selection has an interaction option. As an alternative to sending the interaction option signal to the mobile device, an interaction option message may be displayed on the display connected to the user receiving device or on a display of a remote control device. The user of the mobile device may then decide whether to accept the interaction option via the mobile device and/or the remote control device. The mobile device or the remote control device may then send a response signal to the user receiving device to accept the interaction option. Certain programs may have an interaction option to allow a user to, for example, answer trivia questions, play a game, chat via twitter, etc. Such programs exist, for example, as suits on the USA Network™.

At 716, the user may use the mobile device or the remote control device as a second screen device to interact with the program being viewed on the display connected to the user receiving device. This may include transfer of signals between the user receiving device and the mobile device or remote control device. The signals being transferred may be transmitted to and received from the mobile device via corresponding Bluetooth transceivers of the user receiving device and the mobile device. The signals may be transferred to and from a headend or a content provider via a network (e.g., the network 42 of FIG. 1). The method may end at 718.

Figure 15:
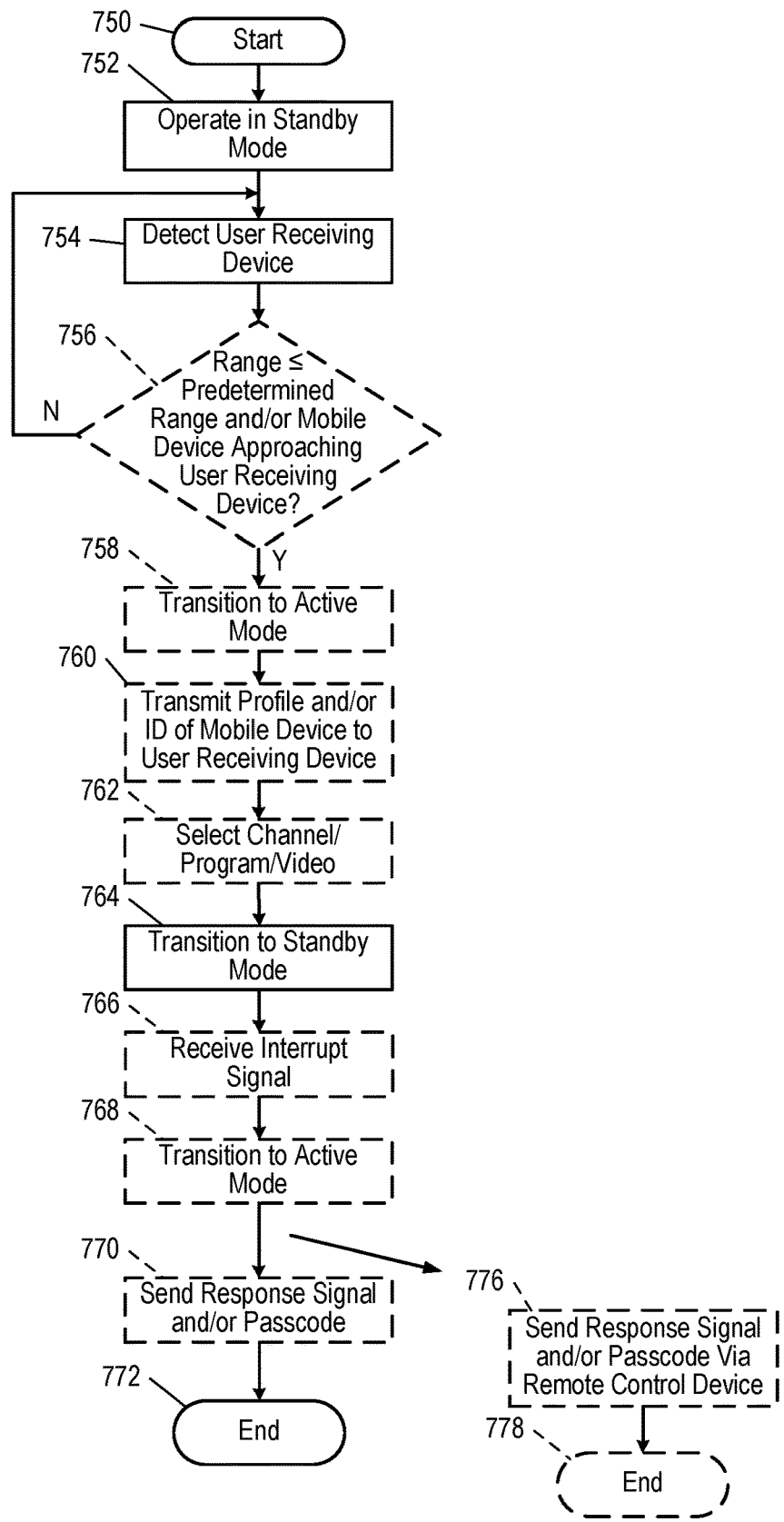
FIG. 15 illustrates a method of operating a mobile device in accordance with the present disclosure.

In FIG. 15, a method of operating a mobile device is shown. The tasks of FIG. 15 may be performed by a control module and/or other modules of a first mobile device. Also, the signals transmitted in the following tasks between the stated mobile device(s) and user receiving device(s) may be Bluetooth signals.

The method may begin at 750. At 752, a first mobile device may operate in a standby mode and/or transition to a standby mode. As an example, the first mobile device may be an adult device or device operated by a user that is an adult. This may include monitoring signals (e.g., beacons or discovery signals) received from user receiving devices. This may also or alternatively include periodically transmitting beacons and/or discovery signals to discover user receiving devices in a predetermined area of the first mobile device.

At 754, the first mobile device detects a user receiving device in proximity to and/or that the first mobile device is approaching and generates a first proximity signal. This may include transfer of Bluetooth signals, such as beacons, discovery signals and/or response signals between the mobile device and the user receiving device. The first mobile device may transmit a unique ID, a profile and/or settings specific to the first mobile device to the user receiving device or the profile and the settings may be pre-stored in the user receiving device. The user receiving device may transmit a user receiving device specific (or unique) ID to the mobile device. The profile may be first mobile device specific and/or user specific. The first mobile device may be paired with the user receiving device prior to performing the method of FIG. 15.

At 756, a proximity module of the first mobile device may determine a range of the first mobile device from the detected user receiving device and/or whether the first mobile device is approaching the user receiving device and generates a second proximity signal. This may include determining a received signal strength indicator value for strength (or power) of a radio signal received from the user receiving device. This may be strength of a beacon, discovery signal, or a response signal received from the user receiving device. If the range of the first mobile device from the user receiving device is less than or equal to a predetermined range (i.e. within the predetermined range) and/or the received signal strength indicator value is less than or equal to a predetermined value, then task 758 may be performed. The proximity module may compare previous and current range values and/or determine a rate at which the range is changing to determine whether the first mobile device is approaching the user receiving device. If the previous range is greater than the current range, than the mobile device is approaching the user receiving device. If the rate is slowing down or negative, than the mobile device may not be approaching and/or may be moving away from the user receiving device. In one implementation, task 756 is skipped.

At 758, the mode module of the first mobile device, based on the first proximity signal and the second proximity signal, transitions to the active mode subsequent to task 754 and/or based on results of task 756. The results of task 756 may be transmitted from the proximity module to the mode module. Task 758 may be performed prior to task 756.

At 760, if not already transmitted the first mobile device may transmit the profile and/or ID of the first mobile device to the user receiving device. At 762, the first mobile device may select a channel, program and/or video to be displayed on a display connected to the user receiving device. This may be done manually by a user by entering a selection and/or picking a selection via the first mobile device.

At 764, the first mobile device may transition to a standby mode. At 766, the first mobile device may receive an interrupt signal due to for example a second mobile device (e.g., child device) coming within a predetermined range of the user receiving device. The interrupt signal may include information regarding the interrupt and/or the second mobile device, which may be indicated to the user of the first mobile device via the display connected to the user receiving device and/or the display of the first mobile device. The interrupt signal may initiate output of an interrupt window to the display of the first mobile device or the interrupt window may be displayed by the user receiving device on the display connected to the user receiving device.

At 768, the first mobile device may transition to an active mode. At 770, the first mobile device may send a response (or resume) signal and/or passcode to the user receiving device to resume viewing, as described above. The response signal may be based on a profile of the second mobile device. The profile of the second mobile device may be shared with the first mobile device to allow automatic resume without receiving an input from the user of the first mobile device. The response signal may be generated based on an input from the user of the first mobile device. The Subsequent to performing task 770, the method may end at 772.

As an alternative to tasks 768-772, tasks 776-778 may be performed by a remote control device. At 776, the remote control device may generate a response signal and/or passcode to resume viewing, as described above. The method may end at 778.

The above-described tasks of FIGS. 12-15 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-described examples enhance a personalization experience by allowing a user receiving device to determine which mobile devices and/or users are in a room. This includes detecting (or sensing) the presence of the mobile devices. Most people who live in a home have their own mobile device. Each of these mobile devices may be Bluetooth enabled and can be paired to a user receiving device in order for the user receiving device to recognize when the mobile devices are in a room of the user receiving device. The user receiving device may than personalize a user experience for one or more users and corresponding mobile devices in a same room as the user receiving device. The disclosed examples enable a user receiving device to detect when a user enters a room by detecting a mobile device carried or brought into the room by the user. The user receiving device may then turn ON a television and adjust settings on the user receiving device and/or the television and/or set features based on a profile of the user and/or the mobile device. The disclosed examples apply to both hardware and software of a user receiving device.

The disclosed examples prevent children from walking into a room where adult content is being viewed on a television by detecting the presence of mobile devices of the children and interrupting display of the adult content. The children are prevented from tuning, via mobile devices of the children, to channels with adult content.

The above-disclosed content providers, head ends, and service providers may include and/or be implemented as respective servers. The servers may include respective control modules for performing one or more of the corresponding tasks and/or functions disclosed herein.

The wireless communications described in the present disclosure with respect to Bluetooth transceivers of user receiving devices and mobile devices may include transmission of data and/or signals having short-wavelength ultra-high frequency (UHF) radio waves in an industrial, scientific and medical (ISM) radio frequency band from 2.4 to 2.485 GHz. The signals may be transmitted based on Bluetooth protocols and/or standards. The signals may be transmitted based on Bluetooth low energy (or smart) protocols and/or standards. The Bluetooth transceivers may include respective antennas.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

A content or service provider is also described herein. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure the transfer of video, programs, or channel information may include and is not limited to the transfer of data, content, information, programs, movie trailers, movies, advertising, assets, video data, etc.

As used herein, the term "title" will be used to refer to, for example, a movie itself and not the name of the movie. While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A user receiving device comprising:
   a proximity circuit configured to repeatedly detect a proximity of a first mobile device relative to the user receiving device using a signal strength of a communication signal received at the proximity circuit from the first mobile device, said proximity comprising a user selectable range corresponding to a signal strength indicator value;
   an output circuit configured to generate a profile window on a display associated with the user receiving device, said profile window comprising a plurality of settings for a plurality of profiles, each of the plurality of profiles comprising a profile identifier, at least one profile identifier assigned to a plurality of mobile devices, each profile comprising a security level that corresponds to channels permitted to be displayed by each mobile device, a permitted on time, the signal strength indicator value and a playlist of saved videos and, said plurality of profiles comprising a first profile corresponding to the first mobile device;
   an interruption circuit configured to, based on comparing the signal strength of the communication signal received from the first mobile device to the signal strength indicator value and the first profile, generate an interrupt signal to interrupt a program or a video being played out on the display when the first mobile device is detected and does not meet the security level, generate a resume message on the display that provides instructions to resume playing of the program or video over the program or video while the interrupt signal is present, and ceasing to generate the interrupt signal when the first mobile device is detected and the proximity is greater than the user selectable range based on comparing; and
   a control circuit configured to, when the interrupt signal is no longer generated or a resume signal is present, resume playing the program or video on the display.

2. The user receiving device of claim 1, wherein the control circuit is configured to receive an input signal from a remote-control device or a second mobile device, wherein the interruption circuit is configured to, based on the input signal, generate a resume signal.

3. The user receiving device of claim 2 wherein the interruption circuit is configured to, based on the input signal, no longer generate the interrupt signal.

4. The user receiving device of claim 3, further comprising a security circuit configured to determine the security level of the second mobile device, wherein:
   the interruption circuit is configured to, based on the input signal and the security level of the second mobile device, cease generating the interrupt signal or generate the resume signal.

5. The user receiving device of claim 1, further comprising a security circuit configured to determine the security level of the first mobile device,
   wherein the interruption circuit is configured to, based on the security level of the first mobile device, refrain from generating the interrupt signal.

6. The user receiving device of claim 5, further comprising:
   a profile circuit configured to determine whether the profile of the first mobile device or a user of the first mobile device has a profile value permitting displaying of the program or video and generating a profile determination signal; and
   the interruption circuit configured to refrain from generating the interrupt signal based on the profile determination signal.

7. The user receiving device of claim 1, wherein the interruption circuit is configured to, based on the detection of the first mobile device, record the program or the video.

8. The user receiving device of claim 1, further comprising a security circuit configured to request a passcode to resume play out of the program or video on the display.

9. The user receiving device of claim 1, further comprising a Bluetooth transceiver, wherein the proximity circuit is configured to detect the first mobile device via the Bluetooth transceiver.

10. The user receiving device of claim 1, wherein:
    the user receiving device is a set top box; and
    the display is a television.

11. A method comprising:
    detecting a first mobile device in a proximity of a user receiving device using a signal strength of a communication signal received at a proximity circuit from the first mobile device, said proximity comprising a user selectable range corresponding to a signal strength indicator value;

generating a profile window on a display associated with the user receiving device, said profile window comprising a plurality of settings for a plurality of profiles, each of the plurality of profiles comprising a profile identifier, at least one profile identifier assigned to a plurality of mobile devices, each profile comprising a security level that corresponds to channels permitted to be displayed by each mobile device, a permitted on time, the signal strength indicator value and a playlist of saved videos and, said plurality of profiles comprising a first profile corresponding to the first mobile device;

based on the detection of the first mobile device, generating an interrupt signal to interrupt a program or a video being played out on the display based on comparing the signal strength of the communication signal to the signal strength indicator value and does not meet the security level in the first profile and generating a resume message over the display that provides instructions to resume playing of the program or video while the interrupt signal is present by generating a resume signal; and when the interrupt signal is no longer generated or the resume signal is present, resuming playing of the program or video on the display.

12. The method of claim 11, further comprising receiving an input signal from a remote-control device or a second mobile device; and based on the input signal, generating the resume signal.

13. The method of claim 12 further comprising:

based on the input signal, ceasing to generate the interrupt signal.

14. The method of claim 13, further comprising:

determining the security level of the second mobile device; and based on the input signal and the security level of the second mobile device, ceasing to generate the interrupt signal or generating the resume signal.

15. The method of claim 12, further comprising:

determining the security level of the first mobile device; and based on the security level of the first mobile device, refraining from generating the interrupt signal.

16. The method of claim 15, further comprising:

determining whether the profile of the first mobile device or the user of the first mobile device has a profile value permitting displaying of the program or video and generating a profile determination signal; and refraining from generating the interrupt signal based on the profile determination signal.

17. The method of claim 12, further comprising, based on the detection of the first mobile device, recording the program or the video.

18. The method of claim 12, further comprising requesting a passcode to resume play out of the program or video on the display.

19. The method of claim 12, wherein the first mobile device is detected via a Bluetooth transceiver.

20. The method of claim 12, wherein:

the user receiving device is a set top box; and the display is a television.

* * * * *